United States Patent Office 3,773,929
Patented Nov. 20, 1973

---

3,773,929
PHARMACEUTICAL COMPOSITIONS COMPRISING ORGOTEIN AND THEIR USE
Wolfgang Huber, San Francisco, and Thomas L. Schulte, Woodside, Calif., assignors to Diagnostic Data, Inc., Mountain View, Calif.
No Drawing. Application Ser. No. 237,507, Mar. 23, 1973, which is a continuation-in-part of applications Ser. No. 3,538, Jan. 16, 1970, and Ser. No. 15,883, Mar. 2, 1970, which is a continuation-in-part of application Ser. No. 576,454, Aug. 31, 1966, which in turn is a continuation-in-part of application Ser. No. 494,048, Oct. 8, 1965, all now abandoned. Divided and this application Nov. 2, 1972, Ser. No. 303,059
The portion of the term of the patent subsequent to Jan. 25, 1989, has been disclaimed
Int. Cl. A61k 27/00
U.S. Cl. 424—177
15 Claims

ABSTRACT OF THE DISCLOSURE

Pharmaceutical compositions comprising, in a pharmaceutically acceptable carrier, an effective unit dosage amount of orgotein, the non-proprietary name assigned to members of a family of globular, soluble metalloprotein congeners whose compact conformation is maintained by chelated divalent metals, usually about 2 GAPM each of Cu and Zn, in isolated, substantially pure or pure form, some of which metalloproteins, in various states of purity, have been named erythrocuprein, hepatocuprein, cerebrocuprein, cytocuprein and superoxide dismutase, are useful in the treatment of inflammatory, shock and toxic conditions.

BACKGROUND OF THE INVENTION

This is a division of application S.N. 237,507, filed Mar. 23, 1973, as a continuation-in-part of application S.N. 3,538, filed Jan. 16, 1970, now abandoned and a continuation-in-part of application S.N. 15,883, filed Mar. 2, 1970, as a continuation-in-part of application S.N. 576,-454, now abandoned filed Aug. 31, 1966, as a continuation-in-part of application S.N. 494,048, filed Oct. 8, 1965, now abandoned.

This invention relates to a method of using pharmaceutical compositions comprising orgotein for the treatment of inflammatory conditions.

SUMMARY OF THE INVENTION

According to this invention, there is provided novel pharmaceutical compositions comprising, in a pharmaceutically acceptable carrier, an effective unit dosage amount of orgotein. In a preferred embodiment, the novel compositions are adapted for parenteral administration, preferably intramuscular. In a method of use aspect, these novel compositions are employed in the treatment of inflammatory conditions by the administration of an antiinflammatory effective amount thereof.

DETAILED DISCUSSION

The tangible embodiments of this invention are pharmaceutical compositions comprising orgotein.

Orgotein is the non-proprietary name assigned by the United States Adopted Name Council to members of a family of water-soluble protein congeners in substantially pure, injectable form, i.e., substantially free from other proteins which are admixed or associated therewith in the sources thereof. In lyophilized form these proteins are greenish-white powders soluble in water, saline, and buffer solutions and injectable without manifesting toxicity or the immunologic reactions typical of foreign-body proteins. Their elemental, infrared, ultraviolet, spectrographic, optical rotary dispersion and other analyses are consistent with their metalloprotein chelate structure. The novel pharmaceutical compositions of this invention are useful for ameliorating and mitigating in humans and other mammals as well as in other animals the adverse effects of inflammatory conditions, of stress conditions, including shock and toxemia, and of certain viral diseases as evidenced by pharmacological and clinical evaluation. See J.A.M.A., May 26, 1969, vol. 208, No. 8; Huber et al., Abstracts Seventh Annual Meeting of the Society of Toxicology,, Washington, D.C., March 1968; Carson et al., Federation Proceedings, 29, 420 [978] (1970).

Orgotein

The metalloproteins of the compositions of this invention are members of a family of protein congeners having a characteristic combination of physical, chamical, biological and pharmacodynamic properties. Each of these congeners is characterized physically by being the isolated, substantiallyl pure form of a globular, buffer and water-soluble protein having a highly compact native conformation which, although heat labile, is stable to heating for several minutes at 65° C. when dissolved in a buffer solution containing a salt of a divalent metal having an ionic radius of 0.60 to 1.00 A. and which on gel electrophoresis gives a characteristic multiple-band pattern. Chemically, each is characterized by containing all but 0–2 of the protein aminoacids, a small percentage of carbohydrate, no lipids, 0.1 to 1.0% metal content provided by one to 5 gram atoms per mole of one or more chelated divalent metals having an ionic radius of 0.60 to 1.00 A., and substantially no chelated monovalent metals or those that are cell poisons in the molecule. Pharmacodynamically, each of the congeners is characterized by being a nontoxic, only weakly immunogenic injectable protein whose pharmacodynamic properties include anti-inflammatory activity. Immunological relatedness of an orgotein congener is sufficient to enable its antibodies prepared in the rabbit or other suitable animal to recognize as an antigen one or more other orgotein congeners and/or for one or more of the antibodies to other orgotein congeners to recognize it as an antigen, as evidenced, for instance, in gel immunoelectrophoresis and/or gel immuno-diffusion. Although some the the physical and chemical properties and the type and degree of pharmacodynamic efficacy of orgotein vary from congener to congener, all orgotein congeners possess the above combination of properties.

Orgotein is readily soluble (>50 mg./ml.) in water and common aqueous buffers, pH 1–13. Orgotein's metal ion content and composition are related to its pharmacodynamic activity. Bivalent cations with ionic radii of 0.6–1.0 A. are the most effective. Combinations of Cu, Mg, Zn and/or Co at a total content of 2–5 gram atoms per mole produces the highest level of physiological activity.

The relative amounts of each of the three metals can vary broadly within this total. Most samples also contain trace amounts of Ca, Fe, and Si as the only other metals detectable by emission spectroscopy. All metals can be removed by prolonged dialysis against $10^{-2}$ M EDTA or $10^{-3}$ M orthophenanthroline below pH 4. The metal ions appear to play a decisive role in maintaining the molecular conformation essential for stability and biological activity, acting as "locking pins" by producing intra-molecular cross links. Differences in affinity for buffer anions may explain why, at identical pH and strength, orgotein behaves differently in certain buffers (phosphate, borate) than in others (Tris, maleate, EDTA).

The aminoacid composition of the orgotein congeners is remarkably consistent irrespective of the source from which it is isolated according to the process of this invention. The close relatedness of orgotein congeners is apparent from the surprisingly small variances in the aminoacid analyses for a protein isolated from such diverse sources as beef liver and chicken red blood cells, as shown in Table I below, which lists the aminoacid composition of several orgotein congeners. All of the congeners shown in Table I contained all of the protein aminoacids or all except tryptophan and/or tryrosine.

Table II lists the distribution of aminoacid residues, calculated for a molecular weight of 32,500, of several orgotein congeners. Table IIa lists other properties of some Cu-Zn chelated orgotein congeners after isolation from a buffer solution containing a mixture of $Mg^{++}$ ($10^{-3}$ M), $Cu^{++}$ ($10^{-4}$ M) and $Zn^{++}$ ($10^{-5}$ M) ions.

TABLE IIa.—PHYSIO-CHEMICAL CONSTANTS OF ORGOTEIN CONGENERS
[Cu-Zn chelates]

| | Bovine Liver | Bovine RBC | Horse RBC | Sheep RBC | Rabbit RBC | Chicken RBC |
|---|---|---|---|---|---|---|
| Isoelectric point | 5.08 | 5.10 | 5.85 | 5.7 | 4.6 | 4.9 |
| $A^{1\%}_{280}$ glycine buffer, pH 8.5 | 2.3 | 2.2 | 2.3 | 1.9 | 1.9 | 2.8 |
| Lipids | Nil | Nil | Nil | N.D. | N.D. | N.D. |
| Carbohydrates [1] | 0.59 | 0.52 | 0.57 | 0.62 | 0.66 | N.D. |
| Metals (GAPM): [2] | | | | | | |
| Copper | 2.14 | 1.77 | 1.88 | 1.84 | 1.83 | 1.78 |
| Magnesium | 0.24 | 0.34 | 0.32 | 0.30 | Nil | 0.22 |
| Zinc | 2.08 | 2.28 | 2.12 | 2.05 | 2.19 | 2.28 |
| Calcium | 0.03 | 0.05 | 0.04 | 0.03 | 0.07 | 0.07 |
| Iron | 0.02 | 0.02 | Nil | 0.02 | 0.07 | 0.04 |
| Manganese | 0.03 | Nil | 0.01 | Nil | Nil | 0.02 |
| Silicon | 0.15 | 0.37 | 0.08 | 0.34 | 0.37 | 0.31 |
| Others | Nil | Nil | Nil | Nil | Nil | Nil |
| Bioassay (Ungar) [3] | 100 | 107 | 102 | 83 | 97 | 96 |
| Superoxide dismutase acitivity, units/mg | 3,600 | 3,300 | 3,200 | 3,000 | 3,900 | 4,000 |

[1] Modified orcinol procedure, expressed as percent glucose.
[2] Emission spectroscopy.
[3] As percent of reference control standard, bovine liver orgotein.

As can be seen in Table I, the orgotein congeners are very similar in aminoacid composition. Their similarity can further be shown by calculating the aminoacid Difference Index (D.I.) of the various congeners, which index gives an indication of the degree of structural relationship between any pair of proteins. To determine the D.I. of one protein relative to another, the absolute difference in the aminoacid content for each of the aminoacids present in the proteins is calculated. The sum of TABLE I.—AMINO ACID COMPOSITION OF ORGOTEIN CONGENERS
[mole percent]

| Aminoacids | Liver, beef | Red blood cells (RBC) | | | | | | | | |
|---|---|---|---|---|---|---|---|---|---|---|
| | | Beef | Sheep | Horse | Pork | Dog | Rabbit | Guinea pig | Chicken | Human |
| Alanine | 5.95 | 5.97 | 6.04 | 5.91 | 5.98 | 5.19 | 6.0 | 7.17 | 7.3 | 7.6 |
| Arginine | 2.52 | 2.68 | 3.33 | 1.99 | 2.65 | 2.46 | 2.8 | 2.58 | 2.6 | 2.8 |
| Aspartic acid | 11.75 | 11.40 | 11.39 | 11.58 | 10.11 | 9.44 | 10.8 | 10.95 | 11.4 | 11.4 |
| 1/2 cystine [1] | 1.80 | 1.74 | 1.53 | 1.68 | 1.85 | 1.79 | 1.7 | 1.40 | 3.1 | 2.8 |
| Glutamic acid | 6.68 | 7.24 | 7.33 | 9.74 | 9.20 | 9.62 | 8.0 | 9.28 | 8.3 | 8.1 |
| Glycine | 16.83 | 16.57 | 16.98 | 16.78 | 17.02 | 17.18 | 17.1 | 17.01 | 17.7 | 16.5 |
| Histidine | 4.90 | 5.22 | 4.50 | 6.46 | 5.28 | 4.90 | 5.3 | 4.81 | 5.4 | 4.3 |
| Isoleucine | 5.75 | 5.86 | 5.98 | 4.56 | 5.17 | 5.79 | 4.9 | 5.90 | 4.8 | 5.4 |
| Leucine | 5.37 | 5.14 | 5.63 | 6.02 | 5.28 | 5.18 | 6.9 | 5.50 | 4.7 | 6.2 |
| Lysine | 6.87 | 6.73 | 7.53 | 8.66 | 7.47 | 6.49 | 6.7 | 6.38 | 6.5 | 7.3 |
| Methionine [2] | 0.59 | 0.46 | 0.44 | 0.75 | 0.56 | 1.77 | 0.9 | 0.46 | 1.0 | 0.5 |
| Phenylalanine | 2.56 | 2.49 | 2.33 | 3.02 | 2.46 | 2.51 | 2.8 | 2.58 | 2.6 | 2.7 |
| Proline | 3.81 | 4.08 | 4.89 | 4.34 | 3.33 | 3.26 | 4.2 | 3.92 | 4.1 | 3.0 |
| Serine | 5.43 | 5.48 | 4.64 | 4.75 | 4.27 | 6.43 | 5.7 | 5.92 | 4.6 | 6.0 |
| Threonine | 8.36 | 7.92 | 6.57 | 5.23 | 8.68 | 6.49 | 6.6 | 5.37 | 5.8 | 5.5 |
| Tryptophan [3] | 0.04 | 0.04 | 0.05 | 0.03 | 0.04 | 0.03 | Nil | 0.15 | N.D. | 1.1 |
| Tyrosine | 0.43 | 0.59 | 0.56 | Nil | 1.15 | 0.60 | Nil | 0.18 | 00.7 | Nil |
| Valine | 10.37 | 10.12 | 10.27 | 9.49 | 9.50 | 10.88 | 9.8 | 10.45 | 9.4 | 9.6 |
| Total | 100.01 | 100.00 | 99.99 | 100.00 | 100.00 | 100.01 | 100.4 | 100.01 | 100.3 | 99.9 |

[1] Determined as cysteic acid after performic acid oxidation.
[2] Determined as methionine sulfone after performic acid oxidation.
[3] Determined by colorimetric method according to Gaitonde, M.K. and Dovey, T., Biochem J. 117, 907 (1970).

TABLE II.—AMINO ACID COMPOSITION OF SEVERAL ORGOTEIN CONGENERS
[Residues per mole, M.W.=32,500]

| Aminoacids | Liver, beef | Red blood cells (RBC) | | | | | | | | | Range |
|---|---|---|---|---|---|---|---|---|---|---|---|
| | | Beef | Sheep | Horse | Pork | Dog | Rabbit | Guinea pig | Chicken | Human | |
| Alanine | 19 | 19 | 18 | 18 | 18 | 16 | 19 | 22 | 23 | 22 | 16-23 |
| Arginine | 8 | 8 | 10 | 6 | 8 | 8 | 9 | 8 | 8 | 8 | 6-10 |
| Aspartic acid | 37 | 36 | 35 | 35 | 31 | 29 | 34 | 34 | 36 | 37 | 29-37 |
| Cystine-1/2 | 6 | 6 | 6 | 6 | 6 | 6 | 6 | 4 | 10 | 8 | 4-10 |
| Glutamic acid | 21 | 23 | 22 | 30 | 28 | 30 | 25 | 29 | 26 | 28 | 21-30 |
| Glycine | 53 | 52 | 52 | 51 | 52 | 53 | 54 | 53 | 56 | 51 | 51-56 |
| Histidine | 16 | 16 | 14 | 20 | 16 | 15 | 17 | 15 | 17 | 14 | 14-20 |
| Isoleucine | 18 | 18 | 18 | 14 | 16 | 18 | 16 | 18 | 15 | 17 | 14-18 |
| Leucine | 17 | 17 | 17 | 18 | 16 | 16 | 19 | 17 | 15 | 20 | 15-20 |
| Lysine | 22 | 21 | 23 | 26 | 23 | 20 | 21 | 20 | 21 | 23 | 20-16 |
| Methionine | 2 | 2 | 2 | 2 | 2 | 6 | 3 | 2 | 3 | 1 | 1-6 |
| Phenylalanine | 8 | 8 | 7 | 9 | 8 | 8 | 9 | 8 | 8 | 8 | 7-9 |
| Proline | 12 | 13 | 15 | 10 | 10 | 10 | 13 | 12 | 13 | 12 | 10-15 |
| Serine | 17 | 17 | 140 | 14 | 13 | 20 | 18 | 18 | 15 | 19 | 13-20 |
| Threonine | 26 | 25 | 20 | 16 | 27 | 20 | 21 | 17 | 18 | 18 | 16-27 |
| Tryptophan [1] | Nil | Nil | Nil | Nil | Nil | Nil | Nil | Nil | 1 | 4 | 0-4 |
| Tyrosine [2] | 2 | 2 | 2 | Nil | 4 | 2 | Nil | Nil | 2 | Nil | 0-4 |
| Valine | 33 | 32 | 31 | 29 | 29 | 34 | 31 | 32 | 30 | 30 | 29-33 |
| Total | 317 | 315 | 306 | 304 | 307 | 311 | 315 | 309 | 317 | 320 | 304-320 |

[1] Colorimetric determination.
[2] Average of amino acid analysis and spectrophotometric determination.

these differences multiplied by 50 is the D.I. of the two proteins. Thus, two proteins of identical aminoacid composition would have a D.I. of 0. H. Metzger et al., Nature, 219, 1166 (1968), report the D.I. for 630 protein pairs. All pairs had a D.I. of at least 9 and all except 4 pairs had a D.I. substantially higher than 9. The D.I. of orgotein congeners, e.g., orgotein from pig, dog, beef, sheep, horse, rabbit and chicekn red blood cells, compared with orgotein isolated from beef liver, is less than 9 and usually less than 8. The very low D.I. of each of the pairs confirms their extremely close structural similarity.

Orgotein is formed of all but 0-2 of the protein aminoacids. Any missing aminoacids are usually tryptophan and/or tryosine. The aminoacid residue content does not vary greatly from congener to congener. With most congeners a substantial variation (more than 6 residues) in the number of residues of any aminoacid occurs in no more than 2 of the aminoacids.

The apparent molecular weight of beef liver orgotein as determined by gel filtration using Sephadex G-200 is about 33,000±3%. Orgotein isolated from beef red blood cells (RBC) was found to have an apparent molecular weight of about 33,500, a variation well within the limit of error of the method. By gel filtration, the apparent molecular weight of horse RBC orgotein is 32,500; sheep RBC, 32,000; rabbit RBC, 33,000; chicken RBC, 32,000. These values are also within the limits of error for this method. Molecular weights calculated directly by aminoacid analysis indicate most congeners are quite close to beef liver orgotein in molecular weights.

Original molecular weight determinations established the molecular weight of beef liver orgotein at about 32,500. Subsequent studies indicated higher and lower figures but exhaustive studies using sedimentation equilibrium analysis have now established that beef liver orgotein indeed has a molecular weight of about 32,500 (±3%). Molecular weights based on the average of the values obtained by osmometry, sucrose density gradient, sedimentation equilibrium, aminoacid profile and gel filtration on a Sephadex G-200 (Pharmacia Inc.) column 90 x 2.5 cm., eluted with saline and phosphate buffer (pH 7.4) using ribonuclease, chymotrypsin, bovine serum, albumin and gamma globulin as standards also are about 32,500. Based on this molecular weight and about a 0.4% ash content, the best values for orgotein are a total of about 310-320 aminoacid residues and about 2-5 grams atoms of metals per molecule.

In the ultra-centrifuge, orgotein in normal saline moves as a uniform, sharp band, with a sedimentation coefficient (beef, horse, human) of about 2.7±0.1 Svedberg Units.

Beef liver orgotein has an isoelectric point at pH 5.10±0.05, and an isoionic point at 5.35±0.1. The isoelectric point of other orgotein congeners varies somewhat, e.g., from about 4.6 to 5.9. The isoelectric point was determined by isoelectric focussing or by gel electrophoresis at different pH's. The isoionic point was determined according to J. Riddiford et al., Biochem. 239, 1079 (1964). The protein was thoroughly dialyzed to free it completely from all electrolytes and then lyophilized. 25.8 mg. of the lyophilized product were dissolved in 5 ml. deionized water, placed in a cell maintained at 25° C. under a nitrogen atmosphere and allowed to come to a stable pH (about 40 to 60 minutes).

The presence of carbohydrate in the protein product was first detected by disc gel electrophoresis, using the Schiff test (W. F. McGuckin and B. F. McKenzie, Clin. Chem. 4, No. 6, December 1965) on acrylamide and cellulose acetate electropherograms of orgotein. Tests with typical sugar reagents after prior acid hydrolysis, indicate the presence in beef liver orgotein of about 0.5-1% carbohydrate, expressed as commonly is done, in terms of glucose. The carbohydrate appears to be covalently bonded to the protein. The carbohydrate, however, is probably a pentose, methylpentose and/or glucuronic acid rather than a hexose as evidenced by known colorimetric reactions (Z. Dische, Methods in Carbohydrate Chemistry, 1, 486, Academic Press, New York (1962)). Heptoses, 2-deoxypentoses, hexosamines and sialic acid also could not be detected. A typical elemental analysis of beef liver orgotein is C, 46.82; H, 6.41; N, 16.13; S, 1.10; P, nil; Ash, <1%.

Gas chromatography and electrophoresis tests establish that orgotein is not a lipoprotein. It contains less than 0.01% lipid phosphorous, less than 0.1% cholesterol, less than 0.05% galactolipid and no detectable water-soluble glycolipids.

The orgotein congeners analyzed to date have numerous titrable ε-amino groups but few titrable —SH and —OH (tyrosyl) groups. For example, beef liver orgotein and beef RBC orgotein contain one titrable OH (tyrosyl) group (N-acetylimidazole titration), one titrable-SH (p-mercuribenzoate) and 15-16 (beef liver) and 16-17 (beef RBC) ε-amino groups (trinitrobenzenesulfonic acid titration).

Orgotein has at pH 7 an infrared spectrum curve typical of proteins.

Beef liver orgotein has a corrected $A_{280}$ (pH 7.0 buffer) of 0.23±0.02 (1 mg./ml.). In Ser. No. 576,454, the $A_{280}$ ultraviolet absorbance of substantially pure beef liver orgotein was reported as 0.585 (1 mg./ml.). This high absorbance was attributed to the tyrosine and tryptophan content of orgotein. Subsequent analytical studies have established that beef liver orgotein has only 2 tyrosine and no tryptophan per molecule, which are too few to account for this high absorbance at $A_{280}$. Cu interacts with orgotein to produce hyperchromicity in the U.V. range.

In U.S. Pat. 3,624,251 and application Ser. No. 3,538, filed Jan. 16, 1970, and entitled "Orgotein Purification Process," there are described processes for removing traces of a tenacious extraneous protein in the samples of orgotein produced according to the process of Ser. No. 576,454. It was found that samples of bovine liver orgotein which are free of this extraneous protein have a substantially lower $A_{280}$, i.e., <0.3. Thus, the high $A_{280}$ absorbance of the orgotein produced according to the process of Ser. No. 576,454 is due to the presence of this tenacious extraneous protein, which is rich in tyrosine and tryptophan residues.

In the visible spectrum, samples of orgotein which contain $Cu^{++}$ in the molecule exhibit a broad peak at 655 mµ, which peak confirms the presence of chelated copper in the molecule.

In gel-electrophoresis, e.g., on polyacrylamide and argarose, orgotein gives a typical pattern showing multiple closely spaced bands at various pH's and a low ionic strength. This multi-band electropherogram pattern is characteristic of orgotein and its congeners but the location of the bands relative to the origin can vary from congener to congener. A typical electropherogram pattern obtained for orgotein from beef liver in thin film, argarose gel is given in the table below. All values are approximate.

Conditions of electrophoresis

Argarose gel—Analytical Chemists, Inc.
Buffer—0.02 M tris; 0.15 M glycine; $1.2 \times 10^{-4}$ M EDTA; 0.08% thymol—pH 8.45; conductivity 280 µ ʊ(mhos)
Power conditions: 3.5 ma., 300→370 v.

| | Approximate band width, mm. | Approximate distance from origin, mm.[2] | Relative intensity |
|---|---|---|---|
| Band 1[1] | 3.0 | 2.8 | 45.1 |
| Band 2 | 3.2 | 9.5 | 38.2 |
| Band 3 | 2.5 | 15.8 | 16.6 |

[1] Closest to origin (most cathodic).
[2] Center of origin through to center of band.

From recent literature data, it is now apparent that this family of metalloproteins includes the proteins previously isolated in various states of purity and given the names hemocuprein and hepatocuprein, Mann & Keilin, Proc. Royal. Soc. for Biol. Sci., 126, 303 (1939); cerebrocuprein, Porter & Ainsworth, J. Neurochem., 1, 260 (1957); erythrocuprein, Markowitz et al., J. Biol. Chem., 234, 40 (1959); and cytocuprein, Carrico & Deutsch, J. Biol. Chem., 244, 6087 (1969). For other references, see Mohamed & Greenberg, J. Gen. Physiol. 37, 433 (1954); Porter & Folch, Arch. Neurol. Psychiat. 77, 8 1957); Porter & Ainsworth, J. Neurochem., 5, 91 (1959); Krimmel et al., J. Biol. Chem., 234, 46 (1959); Wyman, Biochem. Biophys. Acta, 45, 387 (1960); Shields et al., J. Clin. Inv., 40, 2007 (1961); Markowitz et al., Anal. Chem., 33, 1594 (1961); Porter et al., Arch. Biochem. Bioph., 105, 319 (1964); Stansell & Deutsch, J. Biol. Chem., 240, 4299 (1965); ibid, 240, 4306 (1965); Stansell & Deutsch, Clin. Chem. Acta, 14, 598 (1966); McCord & Fridovich, J. Biol. Chem., 248, 5753 (1968); Hartz & Deutsch, J. Biol. Chem., 244, 4565 (1969); McCord & Fridovich, J. Biol. Chem., 248 6056 (1968); Carrico & Deutsch, ibid, 245, 723 (1970). These metallo proteins have been reported to possess very high superoxide dismutase activity. See McCord & Fridovich, J. Biol. Chem., 244, 6049 (1969); Keele, McCord and Fridovich, J. Biol. Chem., 245, 6176 (1970); ibid, 246, 2875 (1971).

Orgotein can be isolated from red blood cells according to the method of U.S. Pat. 3,579,495. It can be isolated from liver and other tissues of a variety of animals, preferably bovine, according to the process of U.S. application Ser. No. 15,883, filed Mar. 2, 1970; Netherlands Pat. 16/14,177; Belgium Pat. 687,828; and British Pat. 1,160,151.

Orgotein's C-terminal group can vary from congener to congener, which shows that it does not play a vital role in orgotein's pharmacodynamic properties. For example, in beef liver and beef RBC orgotein the C-terminal group is lysine; in horse RBC orgotein the C-terminal group is sheep RBC orgotein, it is proline; in chicken RBC orgotein, it is glycine.

Because the aminoacid profile of orgotein varies slightly from congener to congener, its aminoacid sequence also may well vary from congener to congener. Such changes appear not to alter materially either the functional or the pharmacodynamic properties of one orgotein congener when compared to the other members of the family. The determination of the aminoacid sequence, even of a protein of relatively low molecular weight, is a laborious task involving years of research; in addition aminoacid sequence sometimes can vary widely without change of functionality. Thus, to date it has been of little use in the assessment of protein functionality and biological activity. The relatively high molecular weight of the polypeptide chain of orgotein makes identification of a metalloprotein as an orgotein congener by this means impossible for all practical purposes. Of far greater value than aminoacid sequence for identification purposes is the immunological cross-reaction and/or the aminoacid Difference Index of the metalloprotein relative to a known orgotein congener, e.g., beef liver or beef RBC orgotein.

The orgotein molecule in solution is very compact as shown, inter alia, by its pronounced resistance in highly purified state to prolonged heating at elevated temperatures, by the high values for hard-to-exchange amide hydrogen, and by its optical rotatory dispersion values.

Orgotein is at least partially in the form of a metal chelate, i.e., it contains from 1 to 5, preferably about 4, gram atoms per mole of protein (GAPM) of one or more chelated divalent metals having an ionic radius of 0.60 to 1.00 A. Preferably, the predominant metal is one having an ionic radius of 0.65 to 0.79 A., i.e., Co, Cu, Fe, Ge, Mg, Ni and Zn, more preferably Cu or Zn. Above 4 GAPM, at least a portion of the metal content of the protein appears not to be in chelated form and is not required for the physiological activity of the protein to be manifested at its maximum. The total metal content of most samples is about 0.1 to 1% and in the most active samples, it is between 0.15 and 0.75%. The degree of pharmacological activity possessed by orgotein appears to be at least partially dependent upon the presence of one or more physiologically essentially divalent metal ions in the chelate. Therefore, preferably at least 65%, desirably at least 75%, and most preferably 85% or more of the metal content of the chelate is provided by a combination of one or more of Ca, Cu, Fe, Mg, Co and Zn in divalent form, more preferably two or more of Cu, Mg, Co and Zn. For a list of ionic radii of metals, see Hall, "Chemistry and Physics," 44th ed., pp. 3507-8 (1962). In most of such samples, a metal having an ionic radius of 0.65 to 0.70 A., preferably Cu, Mg or Zn is the predominant metal. By "predominant metal" is meant the chelating metal present in highest percentage in the protein chelate. Most orgotein congeners are isolated containing about 2 GAPM each of Cu and Zn.

The monovalent metals, e.g., Na and K, are preferably present in orgotein in at most only trace amounts as part of the metal chelate per se. Orgotein is prepared so that it is virtually free of metals which are cell poisons, e.g., Pb, Cd, Se, etc. The most active chelate samples contain less than 0.01% physiologically non-essential metals, e.g., Al, Si, B. The high Si content of some samples is a tenacious impurity picked up during purification, rather than a chelating metal.

The process of prior filed application Ser. No. 3,538, filed Jan. 16, 1970, can be employed to remove silicones from samples of orgotein by passing a solution thereof in buffer, e.g., 0.1 M phosphate, pH 6.0, at a concentration of 5 to 20 mg. orgotein/ml. through a column of an ion exchange resin having weakly basic or acidic groups, e.g., DEAE-cellulose.

Although most of the metal content of the most active orgotein samples is provided by physiologically essential divalent metals, samples of orgotein often contain undesired other metals. These are often acquired in the isolation process, particularly if the total metal content of the protein is relatively low. This can be avoided by maintaining the protein in a buffer containing one or more physiologically essentially divalent metals of a concentration high enough to retard the acquisition of such extraneous metals and/or by contacting the protein only with equipment which is free from such metals.

The orgotein employed in the pharmaceutical compositions of this invention is substantially pure, i.e., substantially free from other proteins with which the orgotein was admixed or associated in the source thereof. Any extraneous proteins present are innocuous and, for all practical purposes, do not alter the spectrum of activity or efficacy of the orgotein. The orgotein employed is thus substantially free from immunogenic impurities and insoluble, e.g., denatured, proteins. The original samples of orgotein employed contained traces of extraneous proteins which could be detected on gel electrophoresis, most of which move as a broad weak band, moving substantially slower than the three bands characteristic of orgotein. Trace amounts of other impurities which appear as background between the orgotein bands are sometimes present. These slow moving protein impurities can also be present in orgotein isolated from other tissue sources. They are rarely, however, present in orgotein isolated from red blood cells.

As stated above, prior filed application Ser. No. 3,538, filed Jan. 16, 1970, discloses a process for the removal of these extraneous proteins. In this process, a solution of 5 to 20 g./liter of orgotein in a buffer, e.g., monosodium phosphate buffer at pH 6 and at $10^{-3}$ to $10^{-2}$ M concentration, is deposited on a column of an ionic exchange resin having either weakly basic or weakly acidic groups, e.g., DEAE-cellulose; the extraneous proteins are selectively eluted with the same or different buffer at about the same molarity; and the purified orgotein is then eluted with a buffer or higher ionic concentration, e.g., monosodium phosphate buffer at $10^{-1}$ M concentration or the same buffer at $10^{-3}$ to $10^{-2}$ M concentration brought to $10^{-1}$ M ionic strength with other salts, e.g., NaCl.

In the process of U.S. 3,624,251, the orgotein sample is subjected to a post-purification heat treatment at a higher temperature than was employed in the heating step of the isolation process. This process takes advantage of the greater stability of orgotein when in substantially pure form. The heating is conducted in a buffer solution under substantially the same conditions as employed in the previous heating step, except the heating is conducted at about 65° C. for one hour to 75° C. for 20 minutes.

Orgotein is substantially non-toxic. Both acute and long-term chronic toxicity studies failed to reveal any evidence of toxicity attributable to orgotein.

Orgotein appears to be only weakly immunogenic. No precipitating or non-precipitating antibodies in the sera of humans and horses undergoing intermittent clinical treatment with intramuscular injections of bovine orgotein over a period of more than a year were detected. This is very useful clincally because the repeated administration of virtually all known foreign body proteins can result in antibody production at a much faster rate.

Although orgotein is a weak immunogen, it can be made to produce antibodies in sensitive animals, such as rabbit and guinea pig, when introduced therein with strong immuno-stimulants, such as complete Freund's adjuvant. Rabbits are preferred over guinea pigs because of their greater volume of blood. Even with complete Freund's adjuvant, the production of orgotein antibodies in rabbits requires an extensive immunization regimen, often as long as 2–5 months.

Different immunization schedules were evaluated. In responsive rabbits, the following method produces antibodies reliably. An initial dose of 5–10 mg. orgotein in complete Freund's adjuvant is administered partly into the foot pad and partly into various regions around the neck. This is followed 2 weeks later by 2 mg. of orgotein in saline injected into several areas around the neck. The same procedure is repeated at 4 and 6 weeks; thereafter 1 mg. orgotein in saline is given every other week for a total of about 2–4 months. Antibody formation is followed by Dean-Webb titration. Once a constant titer has been obtained the animals are bled and the gamma-globulin fraction isolated from the serum in purified form by chromatography over DEAE-cellulose, according to H. G. Levy and H. A. Sober, Proc. Soc. Exp. Biol. Med. 103, 250 (1960). This is necessary since the anti-orgotein rabbit sera are generally immunologically quite weak. Standard techniques of immunodiffusion immunoelectrophoresis are used for evaluation of antigen-antibody interaction. See, e.g., Experimental Immunochemistry, Kapat and Mayer, Charles E. Thomas, Springfield, Ill., 1967.

The gamma globulin fraction containing orgotein antibodies can be used to identify various orgotein congeners by their immunoelectrophoretic patterns. Immunoelectrophoresis of a highly purified orgotein congener against its rabbit antibody produces a sharp continuous precipitin line arching over each of the multiple bands of the thin film agarose electropherogram of the congener. Thus, a congener of orgotein can be identified as such by the production of a visible precipitin line in immunoelectrophoresis or in gel double diffusion in which that congener is run against the rabbit antibody produced by another orgotein congener or when another congener is run against the rabbit antibody produced by that congener. Gel double diffusion is simpler to run but immunoelectrophoresis is more sensitive.

Rabbit antibodies produced by one orgotein congener will "recognize" as an antigen many but not necessarily all other orgotein congeners. The degree of recognition depends on the conformational arrangement of the recognition areas in the congener. For example, as would be expected, the orgotein-rabbit antibodies produced from an orgotein congener have a high degree of recognition for that orgotein congener, as evidenced by the optimal antigen/antibody ratio in immunoelectrophoretic titration. When the orgotein congener is obtained from a source quite diverse from that used to produce the antibody, e.g., chicken RBC orgotein vs. beef liver orgotein-rabbit antibodies, a much lower antigen/antibody ratio may be optimal. If the source of the respective congeners are too diverse, e.g., beef liver vs. yeast, the antibodies produced from one of the congeners will be unable to recognize the other congener as an antigen, due to the wide species disparity.

If the metalloprotein believed to be an orgotein congener fails to give a precipitin line on immunoelectrophoresis against orgotein rabbit antibodies, this metalloprotein can be used to produce rabbit antibodies in the manner described above. Immunoelectrophoresis of these antibodies against known orgotein congeners almost invariably will result in a "recognition" by the antibodies of one or more of the other orgotein congeners and the production of the characteristic precipitin line.

Thus, although immunological evaluation of a metalloprotein is an indirect, i.e., confirmatory, basis for determining whether the metalloprotein is an orgotein congener, it is conclusive proof if there is recognition by the antibodies produced by an orgotein congener of the metalloprotein and/or if antibodies produced by the metalloprotein recognize an orgotein congener. Since bovine liver orgotein and bovine RBC orgotein antibodies produce a precipitin line in immunoelectrophoresis against many other orgotein congeners, and since those orgotein congeners not recognized by those rabbit antibodies either are recognized by one or more of the antibodies produced by other orgotein congeners or will produce antibodies which will recognize one or more other antibodies, immunoelectrophoresis and gel double diffusion are important parameters to establish whether an unknown metalloprotein is an orgotein congener. Obviously, if the metalloprotein has the combination of physical, chemical and pharmacodynamic properties common to the orgotein congeners examined thus far, the evidence is incontrovertible. However, without examining a metalloprotein for this combination of properties, immunological evaluation alone will provide strong evidence that the metalloprotein is an orgotein congener if it is recognized as an antigen by orgotein antibodies or its antibodies recognize as an antigen an orgotein congener.

Starting materials

The orgotein precursor is present in only minute amounts in natural protein fractions. Its presence was not heretofore detected because conventional isolation techniques were incapable of removing the undesired proteins from the starting mixture without at the same time destroying or removing the desired protein.

A wide variety of natural protein sources contain trace amounts of the precursor natural form of the protein. Such sources include animal organs and tissue, e.g., liver, kidney, testes, pancreas, placenta, intestinal mucosa, thymus, lung, spleen and red blood cells of the rabbit, sheep, lamb, mules, horses, chickens, rats, monkeys, goat, guinea pig, dog, cat, swine, cows, steers, calves, humans, marine organisms, e.g., whale, dolphin, sea lion, shark, swordfish, mussels, lobsters and oysters, vegetable sources rich in protein, e.g., seeds, wheat germ, whole rye, soya, kidney, lima and jackbeans, and mushrooms; also micro-organisms, e.g., fungi and bacteria, including yeasts, E. Coli, streptomyces, penicillium, and saccharomyces. Preferred sources are animal organs and red blood cells (RBC), preferably bovine.

The orgotein precursor is often extracted from the natural protein source along with proteins having enzyme activity, e.g., arginase and carbonic anhydrase, etc. However, except for superoxide dismutase activity possessed by the Cu chelated congener, which is as high as any reported in the scientific literature, orgotein itself does not exhibit generalized enzyme activity. Tests in over 30 different enzyme systems, utilizing a broad range of substrates, have failed to reveal any significant activity when the protein was used in lieu of the enzyme in the respective assay systems. Included were several each of the oxido-reductases, transferases, hydrolases, proteases, lipases and isomerases. Only in the case of catalase, peroxidase and snake venom phosphodiesterase were traces of activity observed, i.e., less than 2% of that of the respective known enzymes run in parallel.

Known techniques for isolating such enzyme-containing fractions can be employed for obtaining a starting protein-fraction containing enriched amounts of the orgotein precursor if the isolation technique employs a freshly harvested source of protein and otherwise meets the requirements for non-destruction of the desired protein. See R. M. Morton in "Methods in Enzymology," Colowick and Kaplan Editors, vol. I, pp. 25–51, Academic Press, New York (1955).

To determine whether a mixture of soluble proteins contains protein precursors of orgotein, a divalent metal having an ionic radius of 0.60 to 1.00 A. is added to a solution of the proteins and enough protein impurities are removed to permit the characteristic multi-band pattern typical for the orgotein protein in gel electrophoresis at low ionic strength to be detected among the other proteins present. To do so, the mixture of proteins to be assayed for orgotein protein content is dissolved at 0–5° C. in a buffer at pH between 1 and 13, e.g., 4–10, preferably about 7.5, which contains dissolved therein a salt of one or more divalent metals. Any buffer-insoluble proteins are removed, e.g., by filtration or centrifugation. The buffer-soluble proteins are then precipitated therefrom with a water-miscible solvent, e.g., acetone. The buffer soluble portion of the precipitated proteins will reveal on gel electrophoresis on polyacrylamide or agarose at low ionic strength, within its overall pattern the narrow, closely spaced multi-band pattern typical of orgotein. The details for running such electropherograms have been described above.

Thin film argarose electropherograms are particularly useful to follow the enrichment of the orgotein protein in the protein mixture. Sample concentrations of 1.0–100 mg/ml., run in 0.17 M tris-glycine buffer at pH 8.45, 5 ma. and 200–300 v. for 30 minutes have proved useful for this purpose. An advantage over disc gel electrophoresis as an analytical tool is their ability to visualize both cathodically and anodically moving proteins as a result of the sample well being near the center of the plate.

Orgotein isolation procedure

The process of this invention is characterized by the isolation of orgotein from a mixture of proteins comprising the orgotein protein, by a multiplicity of fractionation steps employing an aqueous solution at a pH of 1 to 13, preferably 4–10, containing dissolved therein a salt of a divalent metal having an ionic radius of 0.60 to 1.00 A. This characterizing feature is based upon the discovery that orgotein is more stable at pH 4–10 and most stable at about pH 7.5 and is much more stable in the presence of such a salt.

As stated above, orgotein protein is sensitive to pH. Denaturation occurs at pH below 1.0 and above 13. Therefore, solutions of the protein should be maintained at a pH from 4–10 to avoid reduced yields by partial denaturation. The degree of solubility or insolubility under any given set of conditions is also dependent on the degree of purity and the concentration of the desired protein.

Preferably the pH of the solution containing the divalent metal ions is non-acidic, e.g., pH 7.0 to 8.5. When the fractionation step involves precipitation of less soluble proteins while retaining the orgotein in solution, the pH is preferably about 8.5. When the orgotein protein is precipitated, the pH is preferably about 4–7.5, e.g., about 5.0.

Buffers which can be used include any conventional buffered aqueous solvent solution for proteins which provide the requisite pH, e.g., $NH_4H_2PO_4$—$(NH_4)_2HPO_4$, tris(hydroxymethyl)-aminomethane, maleic acid-NaOH, citric acid-sodium citrate, acetic acid-sodium acetate, citric acid-$(NH_4)_2HPO_4$, succinic acid-NaOH, sodium acid maleate-NaOH, sodium cacodylate-HCl, boric acid-borax, etc. See G. Gomori, "Methods in Enzymology," vol. I, pp. 138–146 (1955), especially buffers No. 5–8 and 10–18. Water adjusted to weakly alkaline pH and containing sufficient divalent metal ion can also be used.

As stated above, the desired protein is much more stable, particularly to heat, as a chelate of a divalent metal ($Me^{++}$) having an ionic radius of 0.60 to 1.00 A. It rapidly loses its stabilized compact configuration in the absence of adequate amounts of such chelating metals. Therefore, at least the heat purification step described herein and preferably several or all other isolation steps are conducted employing an aqueous solution containing a salt having an ionic radius of 0.60 to 1.00 A., preferably 0.65 to 0.80 A., more preferably 0.65 to 0.79 A., e.g., $Mg(Ac)_2$, $MgSO_4$, $MgCl_2$, $CaCl_2$, $MnSO_4$, etc., in at least $1 \times 10^{-4}$ M concentration, preferably 0.005 to 0.20 M, e.g., about 0.020 M, when the metal is Mg or Mn. The concentration which should be used is dependent upon the divalent metal used. Magnesium, manganese, calcium and cobalt keep the protein in solution above about 0.2 M or below about 0.02 M concentration of the metal. Zinc and copper bring about precipitation at 0.2 M. Therefore, these should be used at lower concentration than the other metals, e.g., about $5 \times 10^{-4}$ M for copper and $5 \times 10^{-5}$ M for zinc.

In the application of W. Huber, Ser. No. 150,809 now U.S. Pat. 3,687,927, filed June 7, 1971, as a continuation-in-part of Ser. No. 657,866, filed Aug. 2, 1967, now abandoned, there is disclosed an improvement in this process in which the final extraneous protein impurities are removed from the orgotein protein in a buffer solution containing as the sole divalent metal ions, a mixture of $Mg^{++}$, $Cu^{++}$ and $Z^{++}$ ions, in concentration of $10^{-3}$ M, $10^{-4}$ M and $10^{-5}$ M, respectively.

In the process of this invention, which involves the at least partial purification and preferably isolation of orgotein while it is in the form of a metal chelate with one or more divalent metals having an ionic radius of 0.60 to 1.00 A., the predominant metal preferably is one having an ionic radius of 0.65 to 0.79 A. If the chelate is desired whose predominant metal is one having a lower or higher ionic radius, e.g., manganese or calcium (ionic radius 0.80 A. and 0.99 A, respectively), it can be produced by transchelating a chelate whose predominant metal is one having an ionic radius of 0.65 to 0.79 A. or chelation of the apoprotein.

Transchelation techniques known in the art can be used, if appropriately modified to take into consideration the properties of orgotein, e.g., by dissolving orgotein in a buffer solution containing a water soluble salt of a divalent metal having an ionic radius of 0.65 to 0.79 A., with the ratio of metal ion to protein being such as to retain the protein in the selected buffer solution as a metal chelate of such metal. The choice of conditions is limited by the labile character orgotein in the absence of chelating metals and at pH below 1 or above 11.

In addition to certain pH, the orgotein protein is sensitive to heat, the degree of sensitivity depending in part upon its degree of purity and concentration. When very impure, e.g., in the form of a lyophilized mixture of all the soluble proteins from a natural source, the orgotein is reasonably stable. The pure orgotein protein, in its metal chelated form of this invention, is also stable, so that less care is required in handling and storing pure orgotein than substantially pure orgotein.

A typical isolation technique employed to obtain orgotein first removes insoluble materials, using an aqueous solution as a selective solvent for the soluble proteins containing the desired protein. Then materials more soluble than the desired protein are removed employing one or more organic solvent and/or salt precipitation steps in which a fraction of the proteins containing the desired protein is precipitated and the more soluble material is retained in the supernatant. Thereafter, undesired thermolabile soluble proteins are insolubilized by a brief heating step which selectively denatures such proteins. Preparative electrophoresis, preferably gel electrophoresis, or gel filtration can be used to remove residual undesirable, soluble proteins such as, for instance, albumin, thereby providing an injectable protein product free of impurity-induced side reactions.

To isolate the proteins comprising orgotein from natural sources, any gross particles of non-proteinaceous and fibrous insoluble proteinaceous material from a freshly harvested source of protein can be removed in a conventional manner. As soon as possible, the freshly harvested material should be chilled and kept chilled except as indicated herein. A temperature below 10° C. is desirable, preferably below 5° C., e.g., as close as practicable to the freezing point of the aqueous solutions used in the isolation steps.

The first step in isolating orgotein protein from a protein mixture preferably is the removal of insoluble proteins from the mixture. This can be achieved by intimately mixing the finely divided protein mixture with an aqueous solution, preferably a buffer solution, of a pH of 4–12, preferably about neutrality.

After separating the insoluble proteins from the buffer solution of the soluble proteins, e.g., by filtration or centrifugation, separation of the undesired soluble proteins and any remaining non-proteins can be accomplished at least in part, by selective precipitation. Much of the undesired highly soluble and less soluble proteins can be removed from the protein mixture by step-wise selective precipitation of the proteins in the mixture from a buffer solution thereof, using organic or inorganic materials soluble in or miscible with, the buffer solution. For example, lipids, nucleic acids, nucleotides and other extraneous materials can be separated by adding sufficient cold acetone or other water miscible organic solvent to the buffer solution of the soluble proteins. Lipids and other acetone soluble impurities remain in solution. Most or all of the proteins, including the orgotein protein, are precipitated. On extraction of the precipitate with appropriate buffer, the orgotein protein is dissolved while many of the other undesired materials remain insoluble.

Any pigmentaceous material in the buffer solution ought also be removed. This can be accomplished by adding a water-soluble amine, preferably heterocyclic, e.g., pyridine, piperidine, or other water-miscible organic solvent or solvent mixture in which the pigmentaceous material is insoluble, to a solution of the proteins in a buffer solution, e.g., before the precipitation of proteins less soluble than the orgotein protein. Removal of the undesired less soluble proteins can follow, if desired, the separation of the precipitated pigmentaceous materials, by adding an inorganic salt or sufficient additional organic solvent to selectively precipitate some proteinaceous material, leaving the desired protein and the more soluble, undesired proteins and any other extraneous very soluble material in the supernatant. For example, the pigment-free buffer solution of the soluble proteins initially can be brought to 40–55% of saturation with ammonium sulfate or other organic or inorganic salt or by use of organic solvent at a concentration which reduces the solubility of the protein mixture in the buffer, thereby selectively precipitating much of the undesired less soluble protein, which can be discarded. Organic materials which can be used to selectively precipitate undesired proteins include water miscible polar solvents, e.g., lower aliphatic alcohols, such as ethanol and isopropyl alcohol, and acetone, dioxane and tetrahydrofuran. For example, a mixture of chloroform and ethanol can be used to precipitate the pigmentaceous material and then, after removing that precipitate, more ethanol is added until protein precipitation begins to occur. If desired, the chloroform can first be removed under vacuum. Other organic solvents, e.g., the lower-aliphatic alcohols, acetone, dioxane, tetrahydrofuran, can be used in this step.

Orgotein can be selectively precipitated from the buffer solution, leaving more soluble materials therein, by adding additional salt or solvent thereto in the manner described for the removal of the less soluble proteins.

The selectivity and efficiency of these salt and solvent fractionation precipitations of the protein mixtures comprising orgotein are affected by the pH of the buffer solution, which should be maintained between 1 and 12, preferably about 4–10, as well as by the ionic strength and the technique of addition.

An important step in the above-described fractionation process is a heating step in which the proteins more heat labile than orgotein are denatured. This step is preferably conducted after buffer insoluble proteins and non-proteins, pigmentaceous material and organic solvent/water soluble components have been removed. It is important this step takes place with the orgotein protein in the form of a divalent metal chelate. Therefore, the heat treatment ought be conducted in a buffer solution of the protein mixture containing from $1\times10^{-5}$ to $2\times10^{-1}$ M or more, depending upon the metals used, of the ions of divalent metal having an ionic radius of 0.60 to 1.0 A., preferably 0.65 to 0.80 A.

In such a heating step a buffer solution of the mixture of proteins containing the orgotein protein is heated at about 50–75° C. for a period of time from a few seconds up to about 45 minutes, depending on the selected temperature.

The time and temperature employed in the heat treatment are inversely proportional. At this point in the purification process, the desired protein is only briefly stable at temperatures above 75° C. Therefore, unless an instantaneous heating and chilling technique like flash pasteurization is employed, the mixture should not be heated above 75° C. Heating to temperatures below 50° C. usually is not satisfactory because some of the undesired heat labile proteins are fairly resistant to denaturation at such lower temperatures. At this point in the purification process, the desired protein is stable at 55° C. for at least 15–30 minutes, at 60° C. for about 10–25 minutes and at 65° C. for about 10–15 minutes, thus permitting the use of conventional heating and cooling techniques. Therefore, heating at about 55° C. for about one hour to about 70° C. for a few minutes, preferably about 60 to 65° C. for about 10 to 20 minutes, is usually employed.

The amount of orgotein lost in the heating step is partially dependent upon the amount of protein impurities which are denatured and the orgotein concentration. However, the heating step can be conducted on a protein mixture in which none, some, or substantially all of the protein impurities have been previously removed by other techniques.

In the final purification any significant remaining amounts of extraneous proteins are removed to produce the isolated substantially pure orgotein. Because the remaining proteins other than albumin type are less apt to produce undesirable responses upon injection, their virtually complete removal is less critical but nonetheless much preferred. Remaining extraneous proteins can be removed in a variety of ways, e.g., countercurrent extraction, gel filtration, paper or thin layer chromatography, or selective elution from apatite and other inorganic gels or ion exchange columns either singly or in combination. Gel electrophoresis, or resin chromatography using a porous resin which acts as a molecular sieve, e.g., crosslinked dextran, is preferred. Resin chromatography is most preferred for reasons of production economy and because larger amounts of protein can be processed at one time.

An albumin removal step is essential, when the protein source contains albumin, because the other isolation steps usually employed in a process for producing the desired protein product increase rather than decrease the absolute albumin content of the purified protein. For example, the albumin content of the total soluble protein fraction from bovine liver is 7.5%; bovine kidney, 8%; from porcine kidney, 10%; from bovine spleen, oysters and mussels, 2–3%. In the fractionation steps described hereinafter, albumin content of the concentrates rises to 22–31%. Gel electrophoresis or resin chromatography is effective in reducing the albumin content of these concentrates to below 1%.

Thus, concentration without electrophoresis or resin chromatography of a protein source containing significant amounts of albumin causes a build-up of albumin which precludes its safe use as an injectable pharmaceutical agent and prevents it from manifesting useful pharmacological activity. Free-falling curtain electrophoresis is capable of removing much of this albumin. Gel electrophoresis and resin chromatography remove even more. An albumin removal step is not, of course, required when albumin-free starting material, such as red blood cells from many species, is used.

A commercially available electrophoresis unit which can be used for free-falling curtain electrophoresis is the Brinkmann Model FF. The separating chamber in one such unit for instance is 50 centimeters square and 0.5 to 1 mm. in depth. The temperature is maintained as close to 5° C. as possible. The unit permits the collection of up to 48 fractions. In operation, the protein, dissolved in trismaleate-$Me^{++}$ buffer, pH 7.6, is applied continuously. Currents of about 1,000 volts and 20–20 ma. are used. With properly pre-purified protein mixtures, the desired protein chelate will be found in fractions 10–26 which are pooled, dialyzed and lyophilized. The construction and the operating characteristic of this unit limit its capacity to about 500 mg. runs. The isolated protein is obtained in batches of about 100 mgs. which are subsequently pooled. Using this method, albumin levels can be lowered to about 5–10%. However, levels below 5% are not ordinarily achieved.

A more effective purification technique is the gel or "zone" electrophoretic purification described herein which uses a gel supporting medium, e.g., polyacrylamide, agarose, starch, etc. Substantially complete removal of albumin and other extraneous proteins can be achieved by this technique, by virtue of their different speeds of migration.

The preferred preparative gel electrophoresis media is polyacrylamide (5 to 10%). Cellulose, cross-linked dextran (Sephadex, Pharmacia, Upsala, Sweden) and starch modifications (ethanolized, etc.), agar, sucrose-agar and other agar modifications are satisfactory but have the disadvantage of their gels being more fragile. For a description of the principles of gel or "zone" electrophoresis, see "Gel Electrophoresis," J. F. Fredrick, Editor, Annals N.Y. Academy Sci., 121, 305–650 (1964).

A production model developed for disc gel electrophoresis purification has a 5 to 7% polyacrylamide block 32 centimeters long, 10 centimeters wide and one centimeter deep held between jacketed top and bottom plates made from clear plastic. The dimensions of the block are such that cooling is very efficient and the small depth assures rapid temperature equilibrium between center and surfaces. Cooling is provided by a refrigerated circulating system employng ethylene glycol-water. Operation is carried out at 600–1000 volts and 200–500 ma. These currents together with the very efficient cooling make it possible to handle 1–5 g. quantities of starting protein during a developing process of 2–10 hours. The material is applied to a starting trough as a highly concentrated solution in tris-maleate-$Me^{++}$ or similar buffer at pH 7.4. At appropriate times of development, buffer is passed through the gel at right angles to the direction of electrophoretic flow to elute the protein. Location of protein bands, completeness of elution and protein concentration in eluted fractions are determined by spectroscopy at 280m$\mu$ or by staining of indicator sections.

In gel electrophoresis, beef liver orgotein is found between slow-moving, gamma globulin protein type fractions and the fast-moving, albumin-type protein fractions.

Another preferred means for removing albumin and other types of extraneous proteins remaining after the previously described fractionation steps is by chromatography, e.g., using as chromatographing media "porous" resins which "filter" proteins according to molecular volume, i.e., act as molecular sieves. One such resin is Sephadex (Pharmacia, Upsala, Sweden) a cross-linked dextran resin of defined pore size. The partially purified orgotein protein in a buffer-$Me^{++}$ solution, is deposited in highly concentrated form on a column of the resin and then eluted in the manner conventional for chromatographic columns, but using a buffer solution containing a divalent metal of ionic radius of 0.60 to 1.00 A, preferably 0.65 to 0.79 A, e.g., magnesium, or a mixture of two or more of magnesium, copper and zinc, as eluting solvent. Ionic strength variations often facilitate separation and subsequent elution.

In the application of W. Huber, S.N. 815,175, filed Apr. 10, 1969, abandoned in favor of S.N. 31,791, filed Apr. 24, 1970, now U.S. 3,579,495, there is disclosed a process for isolating orgotein from red blood cells. According to that process, the red cells are separated from the plasma of the blood by centrifuging. Repeated washing of the separated cells with isotonic solvents and re-centrifuging removes residual plasma and with it the plasma albumin, adhering to the compacted cells. The plasma-free red cells are then ruptured by hemolysis, using conventional procedures. See M. Moskowitz and M. Calvin, Exp. Cell Res., 3, 33 (1952); S. S. Bernstein et al., J. Biol. Chem., 122, 507 (1938). Hemolysis with deionized water and sonification at 0–5° C. is preferred.

The hemoglobin and stroma are separated from the lysed mixture by methods known in the art. See E. R. Waygood, Methods in Enzymology, vol. 2, 836 (1955), Academic Press. Preferably, for hemoglobin this is accomplished by adding a halogenated aliphatic solvent which apparently forms an insoluble complex with the hemoglobin, along with a water-miscible organic solvent to bring a small proportion of the immiscible solvent into the aqueous phase. Hemoglobin complex and stroma then can be removed by centrifugation.

The supernatant, now substantially free of hemoglobin and stroma, is then freed of carbonic anhydrase and other enzymes by heating the supernatant in the manner described in S.N. 815,175 and Example 4 herein, until the carbonic anhydrase has been inactivated by heating, i.e., 10–30 minutes at 60–70° C. Thereafter the mixture is immediately cooled to well below room temperature. The precipitated proteins are removed by filtration or centrifugation. The supernatant remaining after removal of the precipitated proteins contains the orgotein protein as the, or one of the, predominant proteins. After removal of the precipitate formed in the heating step, the orgotein protein in the resulting solution, or isolated therefrom by dialysis and lyophilization, can be purified and isolated by mixed bed resin filtration, electrophoresis and/or gel filtration through a polymer which acts as a molecular sieve, as described herein.

For literature methods for isolating orgotein, see the references cited above. These products, after processing as described above to provide sterility, non-pyrogenicity and stability, can be employed in the composition of this invention.

Pharmacodynamic properties of orgotein

Pharmacological and clinical data have established orgotein is useful in the treatment of a variety of ailments and diseases in animals, particularly those which result in inflammatory and related stress conditions manifesting themselves in the afflicted animal. This utility has shown no specificity as to any particular species of mammal to date. The action of the orgotein is fast and effective. For example, orgotein in man and horses is useful in relieving the pain, tenderness and disfunction following acute traumatic injuries and in the treatment of orthopedic disfunction, e.g., bony exostosis. It is effective in combating the effects and sequelae of shock and toxic conditions. Orgotein also is effective in certain viral diseases, e.g., human influena A and B, viral horse pneumorhinitis, canine distemper, picorna virus induced feline pneumotracheitis, and disfunctions based on the family of herpes virus. The animal toxicology of orgotein has been extensively studied and found to be largely uneventful, demonstrating its lack of toxicity. Orgotein has been studied extensively in various animal models of induced inflammation, viz., foot paw edema in the rat produced by carrageenin, or yeast, or silver nitrate; adjuvant-induced polyarthritis in the rat; passive cutaneous Arthus reaction; cotton pellet granuloma in the non-adrenalectonized and bi-laterally adrenalectonized rat; pox-virus-induced skin edema in the rabbit; PVA sponge implant-induced inflammation and wound healing and antiserum-induced skin edema and active anaphylaxis in the guinea pig and the mouse. Potent beneficial effects of orgotein were observed in all these models. For biological standardization and quality control the assay based on antiserum-induced skin edema has been used.

In guinea pigs, using this antiserum-induced inflammation according to the method of Ungar et al., Arch. Int. Pharmacodynam. 123, 71 (1959), a highly purified sample of the protein has an inflammatory inhibiting activity of about 50% at a level of 1.0 mg./kg., which is the same order of activity as produced by about 60 mg./kg. of butazolidine and about 20 mg./kg. of prednisolone. Thus, by this test, orgotein has higher potency than two of the standard non-steroidal and steroidal anti-inflammatory agents.

Orgotein is effective in treating a wide variety of inflammatory conditions, including those in which synthetic anti-inflammatory agents have limited utility, e.g. because of toxic side effects upon prolonged use.

More specifically, orgotein is efficacious in ameliorating inflammatory conditions and mitigating the effects thereof, for instance those involving the urinary tract and the joints, in various mammals. It is useful in alleviating the symptoms of and the structural deformities associated with post-traumatic arthritis, and rheumatoid diseases, such as bursitis, tendonitis, osteoarthritis, non-surgical disc syndrome known as ossifying pacchymeningitis in dogs (spondylitis) and myositis. Diseases of the genito-urinary tract which respond to orgotein treatment include both acute and chronic inflammatory conditions, e.g., epididymitis, urethro-trigonitis, intersititial cystitis, radiation cystitis, urethral stricture, chronic congestive prostattis and naphritis with impared kidney function. Orgotein can alleviate uremia and the anemic sequelae, e.g., in cats with cystitis and human patients with uremia and anemia.

Orgotein also has utility in the treatment of diseases involving an imbalance of the auto-immune system, alone and in combination with drugs conventionally used to treat such diseases. Typical are the "collagen" type diseases, e.g., rheumatoid arthritis, lupus erythematosis and scleroderma, allergic states, e.g., penicillin reaction, which are characterized by multiple wheals, indurations, erythemas, edema or itching, and drug-induced, e.g., demeclocylin hydrochloride photosensitization.

States of shock can be reversed by orgotein, e.g., those induced by curare-like drugs, overwhelming sepsis, drug toxicity, carbon monoxide, surgical and traumatic shock, anaphylaxis, etc. even though it does not possess significant CNS stimulant activity.

In animal pharmacology, orgotein has been shown to be effective in a number of standard models of induced inflammation, thus predicting the anti-inflammatory effects observed clinically in man and animals. In the guinea pig skin edema model, when given concomitantly with synthetic anti-inflammatory agents, e.g., prednisolone, dexamethasone and phenylbutazone, orgotein potentiates the suppression of inflammation, thus indicating its use in combination therapy. Since orgotein does not inhibit wound healing and is not immunosuppressive, its substitution for some or all of the anti-inflammatory steroids in anti-inflammatory therapy is especially desirable.

In addition to its broad-based anti-inflammatory effects, orgotein protects from shock reactions produced upon antigenic challenge after prior sensitization. This inhibition of immediate hypersensitivty was also demonstrated in Arthus reaction. These observations established a strong rationale for clinical evaluation of orgotein efficacy in various diseases with allergic manifestations, e.g., asthma, particularly since orgotein does not interfere in delayed hypersensitivity reactions, i.e., is not expected to activate disease processes held in check by cellular-immune phenomena.

Orgotein also has been found to be effective in various in vivo models of virus diseases. In vitro, orgotein was found to be effective against the canine distemper virus, feline picorna virus and human herpes simplex virus. Whether the in vivo antiviral effect of orgotein is on viral proliferation or on inflammatory and/or immunological sequelae of virus infection has not been determined.

The action mechanism of orgotein appears to involve the sequelae of immune-related events. Orgotein at $10^{-5}$ M or less exhibits a pronounced chemotactic effect on PMN's, both in vitro and in vivo, and in vitro inhibits complement per se as well as complement fiaxation in guinea pig, rabbit and human sera. Immune event-related mechanisms thus may be responsible for the efficacy of orgotein as an anti-inflammatory, anti-shock and anti-viral agent. Membrane stabilization effects of orgotein could augment its other effects and contribute to the overall efficacy observed clinically. The action mechanism of orgotein, at least in part, is different from that of both anti-histaminic drugs and corticosteroids.

The safety aspects of orgotein have been exhaustively explored with acute, subacute, and chronic toxicology studies in various animal species, including reproduction and teratology studies. Intravenous, intramuscular vaginal and intraurethral routes of administration have been used. Sensitization aspects also have been thoroughly explored using intradermal and intraperitoneal sensitization routes with intradermal and intravenous challenge routes. No undesirable effects have been seen in any of these studies or in any of the clinical studies in animals and man conducted to date. In vivo, the minimal lethal dose in animals was not attained at doses over 2500 times the anticipated average clinical dose in humans on a weight basis.

Veterinary clinical studies with orgotein have been conducted in orthopedic disorders in horses, in urethrocystitis in cats and in canine distemper. The horse study demonstrated clear-cut drug efficacy in over 75% of the treated animals. In a double-blind, controlled cat cystitis study, interim evaluation of 21 orgotein and 22 placebo cases indicated a pronounced benefit of orgotein administration, statistically significant at the 0.01 level. In a controlled canine distemper study, a preliminary analysis indicated an enhancement of surivival probabilities in the orgotein recipients.

Clinical human investigations have shown orgotein to be effective in the treatment of arthritides. Preliminary clinical evidence indicates at least symptomatic relief in progressive systemic sclerosis. Clinical evaluation of orgotein in urological diseases have shown pronounced efficacy in urethro trigonitis, chronic congestive prostatitis, hydrocele, radiation cystitis, interstitial cystits, and acute epididymitis. Orgotein is also efficacious in the supportive treatment of the side-effects resulting from chemotherapeutic and/or radiation therapy of malignancies. For example, the efficacy of orgotein in normalizing peripheral blood cell counts in cases of inoperable malignancies treated with chemotherapeutic drugs has been demonstrated. Clinical studies have demonstrated that the concurrent administration of orgotein and cytotoxic agents in malignant diseases minimizes or prevents the agranulocytosis which usually results from the chemotherapy. Patients with ovarian carcinoma or malignant melanoma, experienced symptomatic relief i.e., stimulation of appetite and a sense of well-being, while orgotein was administered. Bowel obstruction as a consequence of metastases in ovarian carcinoma cases was relieved by orgotein at doses of 10 to 20 mg. daily for several days. Orgotein also promoted the normalization of peripheral blood counts in irradiated rats whose myelograms showed a dose-dependent increase in the rate of recovery of the bone marrow. In laboratory rodents, prophylactic and post-administration of orgotein afforded some protection against the effects of lethal and sub-lethal irradiation, extending survival and a dose-dependent increase of the rate at which bone marrow cell populations return to normal.

Orgotein can be used in conjunction with accepted forms of therapy and medication, e.g., hormonal, including androgen, estrogen and insulin therapy, which often permits the reduction of the hormonal dose.

Orgotein can be used concurrently or alternatively with steroids in anti-inflammatory therapy, e.g., with cortisone, hydrocortisone, prednisone, prednisolone, and the corresponding $\Delta^{1,4}$-9$\alpha$-fluoro-16-hydroxy, 16$\alpha$-methyl and 16$\beta$-methyl substituted steroids, e.g., dexamethasone, fluorocortisone, fluoromethalone, methylprednisolone, triamcinolone and its acetonide, betamethasone, and their known esters and derivatives, and non-steroids, e.g., acetylsalicylic acid, salicylamide, aminopyrine, chloroquine, hydroxy-chloroquine, phenylbutazone and indomethacin. In so doing, often less than conventional dosages of the synthetic anti-inflammatory products are required, which eliminates or minimizes undesired hormonal and other side effects. Orgotein can also be used concurrently or alternatingly with known agents used in antibacterial and in antiviral therapy to increase the effectiveness of conventional dosages of the known agents or, by reducing such dosages of such agents, the toxic and side-effects ordinarily associated with such therapy.

The exact mode of anti-inflammatory action of orgotein is presently unknown. However, in vitro studies suggest that orgotein can block, at least partially, the inflammatory chain of events at the complement stage, the level of chemotaxis, and the release or activation of lysosomal enzymes and the degranulation of mast cells, RES and other cellular elements. In vivo, these effects prevent or relieve the inflammatory sequelae of pain, swelling, reduction of mobility and generalized tissue damage caused by spillage of ruptured polymorphonuclear leucoctye contents, such as proteolytic enzymes, kinins, cationic proteins, etc., into the site of injury.

Laboratory and clinical studies with beef liver orgotein have established orgotein to be effective against various species of viruses. For example, orgotein is effective in mammals in treating the following virus-caused diseases; respiratory and intestinal influenza (myxo-, adeno- and rhino-viruses); canine distemper, human measles, German measules (rubella virus); herpes zoster; herpes simplex (varicella viruses); mumps; and warts (verucca viruses). The anti-viral activity of orgotein is believed to be due to the mitigation of responses following the intracellular arrival of the virus. The exact mode of action and the exact point of attack are at present unknown. Mitigation could occurs at the level of viral replication or the host response to the infection. Orgotein does not suppress antibody formation.

In vitro studies have shown that orgotein at low concentrations is capable of interaction with highly polymerized DNA and RNA. This interaction may be responsible for its antiviral activity by selectively interfering with those phases of viral multiplication that depend upon the intact viral DNA or RNA molecule. On the other hand, the antiviral activity of orgotein could also be due to stimulation of Interferon production. In addition, its anti-inflammatory activity suppresses the inflammatory symptoms of viral and other infection.

Orgotein displays no evidence of chronic or acute toxicity by tests or in use.

Studies conducted include acute parenteral administration to mice, rats, guinea pigs and monkeys at a single dose of 60 mg./kg., which exceeds the intended clinical dose (0.04 mg./kg.) by more than 1,000 times; subacute intramuscular administration to guinea pigs and monkeys at over 100 times the intended clinical dose; and one-year chronic studies in monkeys and rats at two dose levels, both of which were multiples of those intended for therapeutic use. No adverse behavioral, biochemical, physiological or pathological responses were noted in any of these studies. The typical eosinophilia or monocytosis response to an injected offensive foreign-body protein was absent.

Reproduction and teratology studies in rats and rabbits, conducted at five and fifty times the intended clinical dose, caused no observable adverse responses in fertility, gestation viability or lactation in prenatal or postnatal states in the rat; and resulted in no teratologic alterations in rats and rabbits during the critical periods of organogenesis.

Orgotein is at most only weakly immunogenic. Tests in guinea pigs, using the classic Landsteiner technique with ten intradermal injections spread over 22 days, followed by two weeks of rest and then a challenge injection, revealed no systemic reaction or other indication of sensitization. Attempts at sensitization of guinea pigs by other routes did not yield, on intravenous challenge, the anaphylactic reactions observed with the other proteins which were tested.

Long term, intermittent use in horses and humans failed to produce demonstrable antibodies and proved that the immunogenic potency of the protein is of very low order, which indicates it is safe for use in mammals over long periods of time. In healthy animals immunological responses are virtually absent, particularly when pure orgotein is employed. There are, however, two events which may occur which should not be confused with an immunological sensitization. The first is a temporary exacerbation which sometimes occurs after the first or second injection. The second is local soreness in the muscle at the site of injection which may rarely occur, e.g., within two to six hours after the first or second injection.

This response, which ordinarily disappears within 6 to 12 hours, has been observed most frequently in patients who respond well to orgotein therapy.

Pharmaceutical compositions comprising orgotein

The pharmaceutical compositions of this invention comprise orgotein and a pharmaceutically acceptable carrier. The form and character which this carrier takes is, of course, dictated by the mode of administration.

The pharmaceutical compositions can, e.g., be in a form suitable for oral use, for example, as tablets, aqueous or oily suspensions, dispersible powders or granules, emulsions, hard or soft capsules, or syrups or elixirs.

Compositions intended for oral use may be prepared according to any method known in the art for the manufacture of pharmaceutical compositions and such compositions may contain one or more agents selected from the group consisting of sweetening agents, flavoring agents, colouring agents and preserving agents in order to provide a pharmaceutically elegant and palatable preparation.

Tablets contain the orgotein ingredient in admixture with nontoxic pharmaceutically acceptable excipients which are suitable for manufacture of tablets. These excipients may be, for example, inert diluents, for example calcium carbonate, sodium carbonate, lactose, calcium phosphate or sodium phosphate; granulating and disintegrating agents, for example maize starch, or alginic acid; binding agents, for example starch, gelatine or acacia, and lubricating agents, for example magnesium stearate, stearic acid or talc. The tablets may be uncoated, but preferably are coated by known techniques to delay disintegration and absorption in the gastro-intestinal tract and to protect the orgotein from stomach acids.

Formulations for oral use may also be in the form of hard gelatine capsules wherein the orgotein is mixed with an inert solid diluent, for example calcium carbonate, calcium phosphate or kaolin, or as soft gelatin capsules wherein the active ingredient is mixed with an oil medium, for example arachis oil, liquid paraffin or olive oil.

Aqueous solutions contain the orgotein in admixture with excipients suitable for the manufacture of stable aqueous solutions, e.g., NaCl, to provide a saline or isotonic solution, buffer agents, acids or bases, etc. The aqueous solution can also contain one or more preservatives, for example ethyl or n-propyl p-hydroxybenzoate.

Oily suspensions may be formulated by suspending orgotein in an oil suitable for injection, topical or oral administration, in a vegetable oil, e.g., arachis oil, olive oil, sesame oil or coconut oil, or in a mineral oil, e.g., a liquid paraffin. The oily suspensions may contain a thickening agent, for example beeswax, hard paraffin or cetyl alcohol. These compositions may be preserved by the addition of an antioxidant, e.g., ascorbic acid.

The pharmaceutical compositions of the invention can be in the form of oil-in-water emulsions suitable for oral or parenteral administration. The oily phase may be a vegetable oil, e.g., olive oil or arachis oils, or a mineral oil, e.g., liquid paraffin or mixtures of these. Suitable emulsifying agents are naturally occurring gums, e.g., gum acacia or gum tragacanth, naturally occurring phosphatides, e.g., soya bean lecithin and esters of partial esters derived from fatty acids and hexitol anhydrides, for example sorbitan monooleate, and condensation products of the said partial esters with ethylene oxide, for example polyoxyethylene sorbitan monooleate.

The compositions of this invention can also be in the form of an aerosol for inhalation or topical administration slow-dissolving pellets for implantation.

The compositions of this invention can be administered parenterally, orally and topically. The term parenteral as used herein includes subcutaneous, intradermal, intravenous, intramuscular, intraocular, intrastroma, intrasynovial, intrathecal, intramural, intraarticular, intraperitoneal, intrascrotal, intraosseous, intraspinal, intraligamentous and intrasternal. Intramuscular and subcutaneous administration is usually preferred except when the orgotein is administered proximate a localized area of inflammation.

The pharmaceutical compositions can be in the form of a sterile injectable preparation, for example, as a sterile injectable aqueous solution. The solution can be formulated according to the known art using those carriers mentioned above. The sterile injectable preparation can also be a sterile injectable solution or suspension in a nontoxic parenternally acceptable diluent or solvent, e.g., 1,3-butanediol.

The compositions of this invention can be in the form of suppositories for vaginal and rectal administration. These compositions can be prepared by mixing orgotein with a suitable nonirritating excipient which is solid at ordinary temperatures but liquid at the rectal temperature and will therefore melt in the rectum to release the drug. Such materials are cocoa butter and polyethylene glycols.

The compositions of this invention combine an effective unit dosage amount of orgotein, i.e., the orgotein is present at a concentration effective to evoke the desired response when a unit dose of the composition is administered by the route appropriate for the particular pharmaceutical carrier. For example, liquid compositions, both topical and injectable, usually contain about 0.5 to 20 mg. of orgotein per 0.25 to 10 cc., preferably about 0.5 to 5 cc., except I.V. infusion solutions, which can also be more dilute, e.g., 0.5 to 20 mg. orgotein per 50–1,000 ml., preferably 100–500 ml. of infusion solution. Tablets, capsules and suppositories usually contain 0.1 to 25 mg., preferably 1 to 10 mg., per unit.

The weight ratio of orgotein to liquified propellant in an aerosol for topical or inhalation, administration can be quite high, e.g., 0.5–5%. Topical compositions usually contain orgotein in a concentration of 0.1 to 1% in aqueous solution or non-aqueous suspension.

The amount of orgotein administered is dependent on several factors, including the species of patient, the condition of the patient prior to orgotein therapy, the particular disease and its progression and the route of administration. The usual individual parenteral dose range of orgotein is about 0.5 mg. to 20 mg., usually 1 mg. to 5 mg. The dose is not significantly dependent on the weight of the patient. For example, within a dosage regimen in animals, a usual single dose for a cat (0.5–20 lbs.) is about 1 mg.; for a dog (5–50 lbs.) 2 mg.; and for a horse (1,000 lbs.) 5 mg. Rather, the size of an individual dose is more dependent upon the dynamics of the disease pattern. For instance, with a severe infection, e.g., with associated toxemia or uremia, injections spaced about every six hours are required, with the frequency subsequently reduced to 8–12 hours and then every 24 hours or longer, depending on the clinical picture. Thus, during the acute state of a disease, the frequency of the injections is often more critical than the amount of each individual dose.

Larger individual doses are usually administered when orgotein is administered orally, e.g., 5 mg.–25, 50 or 100 mg., or even more. Similarly, when a solution or suspension of orgotein is applied topically to the skin or infused into the bladder, vagina, large intestine, etc., the total amount of orgotein administered in single uninterrupted dosing can vary from 5 to 100 mg. or more. Conversely, when orgotein is administered into the respiratory tract, e.g., in the treatment of asthma, anaphylactic or other acute shock conditions, e.g., as a spray, mist, aerosol, etc., lesser amounts, e.g., 5 to 0.5 mg. or less, are sometimes indicated.

The spacing of the individual doses is also partially determined by the nature of the ailment. In treatment of inflammatory syndromes, orgotein is usually administered in multiple successive dosages, spaced as frequently as 6–12 hours apart and as long as six weeks apart. Usually, daily doses are administered until symptomatic relief, e.g., from pain and stiffness, is obtained. Thereafter, doses are spaced further apart, the frequency being adjusted so that recurrence of symptoms is avoided and relief maintained. Treatment can be continued over a period of several weeks or months, and indefinitely for advanced chronic cases.

In treating viral infections, orgotein is usually administered in multiple successive dosages, spaced as frequently as every six hours. Usually, doses every 6 to 12 hours are administered until symptomatic relief, e.g., from pain and fever, is obtained from the viral infection. Thereafter, doses spaced 1 to several days apart are administered until all symptoms of viral infection are gone. Treatment is continued until all symptoms and signs are gone. A subsequent booster shot or two may be given after several days. The number of successively spaced doses of orgotein necessary in order to alleviate at least some of the symptoms associated with the viral infection will vary widely, depending on the nature and status of the infection. In some cases, clinical relief is obtained in a period of a few hours. Others require longer periods of therapy of from several days up to several weeks. Because symptomatic relief sometimes precedes complete elimination of the viral infection, care must be taken not to terminate orgotein therapy prematurely.

Orgotein usually is administered by installation or by injection, e.g., intramuscularly, subcutaneously, intravenously or intradermally. I.M. is preferred, except in case of shock where I.V. is sometimes preferred for more rapid onset of effect, and in certain localized disorders, e.g., radiation and interstitial cystitis, where local injection is often more effective. Individual doses usually fall within the range of 0.5 to 20 mg. The preferred range for humans is about 0.5 to 4 mg.; for horses, about 5.0–10.0 mg. The exact dosage is not critical and depends on the type and the severity of the disease.

Oral administration is possible if the protein is protected from the destructive action of the acid pH and enzymes of the stomach, e.g., in the form of an enteric coated tablet, although much larger doses are required by this route. The protein has topical activity, e.g., when applied as a solution, aerosol, cream, ointment, salve, etc., which renders it useful for treating corneal and conjuctival, respiratory, genito-urinary and dermatological disorders. Desirably, it is administered with a surfactant and/or penetrant to ensure better contact and penetration.

Without further elaboration, it is believed that one skilled in the art can, using the preceding description, utilize the present invention to its fullest extent. The following preferred specific embodiments are, therefore, to be construed as merely illustrative, and not limitative of the remainder of the disclosure in any way whatsoever.

PREPARATION 1

The following is a general procedure for isolating proteins from natural sources thereof to provide a suitable starting proteinaceous material for the process of this invention.

Mechanically remove as much extraneous material as possible from a freshly harvested, washed and cleaned plant or animal source of protein. In the case of animal tissue, glands and organs, remove fat, connective tissue and blood vessels. Conduct all subsequent steps below 5° C., except as indicated.

(a) Toluene method

Homogenize the protein source and immediately add 3 vol. of deionized water or a suitable buffer, 0.05–0.30 M, e.g., maleate, phosphate, tris-maleate, barbital, tris-hydroxymethyl-aminomethane, borate, cacodylate, glycine-sodium hydroxide, etc., containing $1 \times 10^{-4}$ to $2 \times 10^{-1}$ M of a water soluble salt, e.g., chloride, sulfate, phosphate, acetate, citrate, maleate, borate or phosphate, etc. of a physiologically essential divalent metal, e.g., calcium, cobalt, copper, iron, magnesium, manganese or zinc. Adjust to pH 7.0–7.8. Stir the resulting mixture for several hours. Then add slowly 0.01 vol.-equivalent of toluene and continue stirring for several more hours. Let sit until the supernatant is reasonably clear. Filter, e.g., through cloth, cotton, glass wool or filter-aid, or centrifuge. Exclude direct light in these operations. Immediately freeze the filtrate and lyophilize it. If direct lyophilization proves difficult, dialyze first against 0.001 M buffer containing $0.1–5 \times 10^{-4}$ M bivalent metal salt, e.g., $Ca^{++}$, $Co^{++}$, $Cu^{++}$, $Fe^{++}$, $Mg^{++}$, $Mn^{++}$, $Zn^{++}$. The resulting powder can be stored in the cold, preferably at below 0° C.

(b) Acetone powder method

Suspend finely disintegrated whole tissue in any of the buffer—$Me^{++}$ mixtures of (a) above, bring to pH 7.0–7.8 and cool the dispersion to 0°. Add to the dispersion very slowly 10 vols. of acetone at −10° C. with rapid mechanical stirring. Let settle for about 10 minutes, and decant the supernatant aqueous acetone. Collect the precipitate either by centrifuging or by vacuum filtration through a No. 1 Whatman paper on a wide Buchner funnel in a cold room at 0°. Wash the precipitate twice by suspending on each occasion in about 3 vol. (calculated from the original volume of dispersion) of acetone at −10° C. Remove the acetone from the precipitate, first using a stream of nitrogen followed by drying the powder in vacuo over $H_2SO_4$. The last acetone treatment can be followed by washing with dry peroxide-free diethyl ether (at −15°), which greatly facilitates rapid drying. Store the dried material in the cold, preferably in vacuo over a drying agent.

Alternatively, disintegrate the whole tissue directly in 10 vol. of acetone at −15° in a Waring Blendor (for 3 minutes), and retreat the precipitate with acetone as described above.

If the first acetone precipitate contains much lipid material, washing it with n-butanol at −15° greatly improves the subsequent extractions.

Alternatively, cut 1 kg. of fresh bovine liver, free from connective tissue, into five or six pieces, rinse with tap water and mince. Homogenize portions of mince (200 g.) in a Waring Blendor with 200 ml. cold iso-osmotic KCl solution for 20 sec. Immediately mix the homogenate in the blender with 200 ml. of acetone at −10° for another 20 sec. Pour the acetone-treated homogenate with stirring into a 10 liter beaker containing 2.5 liters of acetone at −10°. When the final portion of mince has been treated, add to the contents of the beaker cold acetone to a volume of 10 liters and mix. Hold at 4° for a few minutes. Decant the clear supernatant and again mix the contents of the beaker with acetone to 10 liters. Decant the clear supernatant and filter the suspension rapidly on a Buchner funnel covered with a sheet to exclude as much air as possible. Before the cake on the funnel is completely dry, wash with 2 liters of cold acetone.

Continue the filtration until the particles are completely dry. Break up the solid material, spread out on filter paper and air-dry, preferably under a cover of nitrogen. Finely grind the powder while cold and store in vacuo at 4°. The yield is about 250 g. of powder.

PREPARATION 2

The following is a general procedure for producing and isolating orgotein from protein sources of the type produced in the above-described Preparation 1.

All operations are carried out in 0.1 M tris-maleate-$Me^{++}$ buffer at pH 7.4, unless otherwise indicated. 0.05 M to 0.2 M tris-phosphate-$Me^{++}$, tris-succinate-$Me^{++}$, tris-glycine-$Me^{++}$ and tris-HCl-$Me^{++}$ buffers work equally well. All operations involving organic solvents are carried out at 0 to 2° C., or lower using organic solvents precooled to −10° C. All other operations are at temperatures below +5° C., except as indicated.

(A) Removal of buffer-insoluble material

In the cold and in the absence of direct light, stirr 100 g. of dry powder, obtained according to Preparation 1, into one liter of tris-maleate buffer. After several minutes add 6.5 g. $MgSO_4 7H_2O$ in portions and adjust pH to 7.4 with 1 N sodium hydroxide. Then add an additional 600 ml. of tris-maleate buffer and an additional 6.5 g.

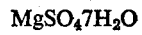
$MgSO_4 7H_2O$

Re-adjust to pH 7.4. Then add an additional 400 ml. water and continue stirring in cold room until about 6 hours have elapsed from the start of the operation. Let the mixture settle and then filter or centrifuge. Adjust the filtrate to pH 7.8, hold in the cold until precipitation is complete, centrifuge and filter supernatant. For storage, lyophilize the filtrate as described in the preparation.

With some raw materials, e.g., liver, the above step and the antecedent Preparation 1 preferably is carried out with 0.1 M manganese sulfate providing the bivalent metal. Transchelation, i.e., removal of most manganese and replacement by magnesium, is achieved using tris-maleate-magnesium salt buffer in a subsequent step. In some cases, it is desrable to carry the manganese-tris-maleate buffer through the pigment removal step and sometimes even through the heat-treatment step. In still other cases, use of buffer containing other bivalent ions, e.g., Ca, Co, Cu, Fe, Zn, may be desirable in the initial and/or intremediate steps. About a 50% or less yield of powder is obtained, based on the dry weight of the proteins in the starting natural source.

(B) Pigment removal

This step often is necessary with protein fractions obtained form dark-colored sources, e.g., liver, kidney, lung, spleen, jackbeans, certain bacteria, etc. Proteins form other tissues, such as testes, pancreas, placenta with blood clot removed, thymus, heart and other muscle, marine animals and other microorganisms usually do not require this step.

100 g. of powder from Step A are suspended with stirring in 400 ml. cold 0.1 M tris-maelate-$Mg^{++}$ buffer at pH 7.2. Let stand in cold room until the precipitate has settled, centrifuge at 1–2° C. and decant.

If pyridine is used, divide the decanted liquid into five equal parts. Slowly and with stirring, add to each 8.0 ml. of pre-cooled c.p. pyridine. Then add 40 ml. of 0.1 M tris-maleate-$Mg^{++}$ buffer to each portion. Centrifuge at 1–2° C., e.g., at 13,000 r.p.m. for 15 minutes. Decant and recombine the supernatants. Discard the precipitate.

If chloroform-ethanol is used, to the decanted liquid slowly and with stirring add 15% by volume of a pre-cooled mixture of one part chloroform and two parts ethanol. The temperature should remain below 4° C. during the addition. Centrifuge, e.g., at 12–14,000 r.p.m. for about 10 minutes, and discard the dark-colored precipitate. The lightly colored, opalescent supernatant is kept cold.

At this point, the partially purified desired protein can be precipitated with solvent, the precipitate freed of adhering solvent in vacuum, re-dissolved in about 0.15 M tris-maelate-$Mg^{++}$ buffer, pH 7.4. Any insolubles are removed by centrifugation and discarded.

The thus-obtained solution can be lyophilized, with or without prior dialysis. The resulting off-white powder is stable for several months when kept in the freezer.

(C) Less soluble material removal

The cold tris-maelate-$Mg^{++}$ buffer solution from Step A or B at a pH of about 6.0 to 7.5, or its freshly made equivalent from lyophilized powder, is brought to 40–45% of saturation with ammonium sulfate, added with stirring in portions either as solid or as saturated aqueous solution. Hold the temperature at 0–5° C. Keep the mixture 10–30 minutes in the cold until precipitation is complete. Centrifuge at 8,000–12,000 r.p.m. and discard the precipitate. Keep the supernatant for several hours in the cold. Centrifuge and discard any further precipitate.

Alternatively, to a 250 ml. portion of the supernatant obtained from Step B or 62 g. of pigment-free protein obtained in Step A and dissolved in 250 ml. of 0.1 M tris-maleate-$Mg^{++}$ buffer at pH 7.5, slowly add with stirring about 0.9 volumes of ethanol or about 0.75 volumes of acetone pre-cooled to −10° C., i.e., an amount sufficient to precipitate only a portion of the proteins. The temperature of the mixture should not exceed +2° C. As soon as precipitation is complete, centrifuge in the cold, e.g., at 8,000–12,000 r.p.m., and discard the precipitate.

(D) Heat labile protein removal

Heat the supernatant obtained from Step C in a round-bottom flask or glass lined kettle in a bath kept at 65–70° C. Stir the solution vigorously until the temperature of the contents reaches about 59° C. and hold for about 20 minutes at or near this temperature. Immediately thereafter immerse the flask into a Dry Ice-solvent or an ice-salt bath and continue stirring vigorously until the temperature has dropped to 2–5° C. Centrifuge the resulting bulky precipitate in the cold and discard.

(E) More soluble material removal (1) Salt precipitation: Preferably at a pH of about 6.0 saturate the buffer solution from Step D with ammonium sulfate as above to 58–76% and hold ½ to 2 hours in the cold until precipitation is complete.

Take up the nearly white ammonium sulfate precipitated material in 10–15 times its weight of 0.10 M tris-maleate-$Mg^{++}$ buffer and hold for ½ hour in the cold. Centrifuge off and discard any insoluble or further precipitate.

(2) Solvent precipitation: To the same starting solution as used in (1), preferably at a pH of about 3.5 or about 7.5, add in portions and with stirring pre-cooled (−10° C.) acetone or ethanol, keeping the temperature around 0° C., in an amount sufficient to precipitate at least a portion of the proteins in solution. If, for instance, 0.5 volumes of acetone were used to precipitate less soluble proteins, use about 0.5 to 1.5 additional volumes. Keep the mixture for a few minutes at about 0° C. until the precipitation is complete. Centrifuge the precipitate at 1° C. or below (10,000–13,000 r.p.m.). Separate and free the precipitate from adhering solvent under vacuum in the cold. Check the supernatant for the extent of precipitation by addition of 0.2 volume of pre-cooled (−10° C.) acetone or ethanol. Isopropyl alcohol (0.5–2 v./v.) can also be used.

Preferably, ammonium sulfate fractionation is used to precipitate the less soluble proteins and solvent fractionation to precipitate the desired protein.

(F) Electrophoresis

Fractionate a solution of the protein precipitated by Step E in 10–15 times its weight of 0.1 M tris-maleate-$Mg^{++}$ buffer (discarding any insoluble material) by gel electrophoresis using polyacrylamide with the running gel at pH 8.0 to 9.5 or at pH 3.0 to 4.3.

The following apparatus is used in the gel electrophoresis step:

Electrophoresis chamber; Buchler power supply; loading rack; syringes (disposable plastic 20 cc., 5 cc., 1 cc.); syringe needles 22 g. x 1½ and 25 g. x ⅝; Teflon tips for layering tool; photopolymerizing light (fluorescent light source).

The electrophoresis chamber should be thoroughly washed and rinsed in distilled water. The chamber is then immersed in a Siliclad (Clay-Adams, New York) solution (1 part Siliclad to 50 parts of water) for a few minutes. It is then rinsed and oven-dried.

The electrophoresis chamber used is the special production model described heretofore.

The reagents used are the following:

Acrylamide monomer (Eastman No. 5521); N,N'-methylenebisacrylamide BIS (Eastman No. 8383); riboflavin (Eastman No. 5181); N,N,N',N'-tetramethylethylenediamine TEMED (Eastman No. 8178); glycine (Eastman No. 445); TRIS (tris-hydroxymethyl-aminomethane) (Fisher T–395); sucrose (Baker No. 4072); ammonium persulfate reagent grade; 1 N HCl; 1 M $H_3PO_4$; acetic acid; and methanol (reagent grade). Small pore gel, 7%, is used.

The stock solutions used are:

(a) 1 N HCl, 480 ml.; TRIS, 363 g.; TEMED, 4.6 ml.; and $H_2O$ to make 1,000 ml. (b) 1 M $H_3PO_4$, 256 ml.; TRIS, 57 g.; and $H_2O$ to make 1,000 ml. (pH 6.9). (c) Acrylamide, 280 g.; BIS, 7.36 g.; and $H_2O$ to make 1,000 ml. (d) Acrylamide, 100 g.; BIS, 25 g.; and $H_2O$ to make 1,000 ml. (e) Riboflavin, 40 mg. and $H_2O$ to make 1,000 ml.

Working solutions used are:

Mixture A: 1 part (a); 2 parts (c); and 1 part ($H_2O$).
Mixture B: Ammonium persulfate, 1.00 g.; and $H_2O$, 1,000 ml.

The buffer solution used is: TRIS, 60 g.; glycine, 288 g.; H₂O to 20 liters; pH, 8.45.

Tracking dye used is 0.001% Bromphenol Blue. It was found that for the best separations fresh buffer should be used for each run. The buffer can be used for a maximum of 3 runs with some loss of resolution on the second and third runs. All solutions should be stored in the refrigerator. If they are, they are usable for several months, except Mixture B which should be made fresh weekly.

Equal parts of Mixture A and Mixture B taken directly from the refrigerator are mixed in a filtering flask. The flask is attached to the aspirator and the contents are swirled gently for about a minute in a partial vacuum. The chamber is then filled with the cover on, to ⅝ inch from the top using a long thin tube. The thin tube is inserted to the bottom of the chamber and is slowly withdrawn as the slab is filled, keeping the tip beneath the gel surface. The gel is then water layered and placed on top of a drying oven. Gelling is complete in about 15 to 30 minutes.

A water layering tool can be made from a plastic syringe and a 25 g. x ⅝ inch needle tipped with a Teflon tip (Analytical Chemists, Inc.). The syringe is filled about ⅓ full with water, tinted blue with tracking dye solution. The Teflon tip is placed just beneath the surface of the gel and moved upwards as the water is expelled onto the gel. The tip should at no time be lifted above the surface of the liquid.

After polymerization, the water is carefully removed. The surface is rinsed once with degassed sucrose gel.

The sample (0.5–5.0 g.) is suspended in water, 0.9% saline or in TRIS buffer, mixed with gel and filled into the pre-formed trough of the gel slab. The surface is sucrose layered and sealed with a capping gel. Capping gel is added until a convex miniscus is formed. A plastic cover is then slid across the top so that no air bubbles are trapped. The loaded trough is placed between two fluorescent lamps as close to the lights as possible. Polymerization is complete between 30 minutes and an hour depending on the amount and nature of sample used.

When polymerization is complete as indicated by opacity of sample and capping gels, the cover is removed and the chamber loaded into the buffer reservoirs. The apparatus and buffer are pre-cooled before a run and the run is made at about 5° C. or less. The power supply is set to give constant current which is set at 100–200 ma. depending on the amount of sample and the size of the gel slab. A run takes 2–6 hours and at the end the tracking dye will have traversed nearly the whole slab.

After the run, the desired orgotein is found in the area comprising about 20–30% of the distance travelled by the tracking dye from the point of origin. It is well-separated from the much faster travelling albumin and albumin-type fractions and also well-separated from the small amounts of much slower travelling extraneous protein fractions.

The desired orgotein is eluted from the gel by a crosscurrent of tris-maleate buffer 0.1 M containing 0.001 M $Mg^{++}$. Progress of the elution is monitored by U.V. absorption at 280 m$\mu$. Uniformity is checked by analytical disc gel electrophoresis followed by staining with Amido Black. If desired, the albumin-type and the slow fractions can be recovered in a similar manner using tris-maleate buffer.

In the cationic system at pH 3.8 in the running gel, potassium ion is used as the leading ion and β-alanine as the trailing ion. Acetic acid is used as the buffer. The procedure followed with these systems is the same as that used with the anionic system (running gel pH 9.4).

To isolate the desired orgotein from the eluate, dialyze exhaustively against 0.001 M tris-maleate-$Mg^{++}$ buffer and then against deionized water and lyophilize. A white fluffy powder representing about 6–16% of the ammonium sulfate or solvent precipitated product is obtained.

A typical overall yield of isolated orgotein is 0.005 to 0.015%, calculated on the dry weight of the original source material.

PREPARATION 3

All operations, unless otherwise indicated, are carried out in a cold room (2–5° C.).

Preparation

Fresh beef liver is ground into a plastic container. Cold distilled water (two liters per kg. of liver) is added with stirring and the mixture is adjusted with 0.1 N sodium hydroxide to pH 7.5 to 7.6. Sufficient 2 M manganese sulfate solution is added to bring the molarity of the mixture to 0.05. The pH is adjusted to 7.6 and fresh cold water is added to bring the water to three liters per kg. of liver. Thereafter, 50 ml. of toluene per kg. of liver are added and the mixture is stirred in the cold room overnight.

Removal of more soluble material

The next morning the suspension is passed through plastic gauze and to the filtrate 1.5 volume of cold acetone (−10° C.) is added with gentle stirring. The acetone is added through a glass tube extending well below the surface of the mixture. The ensuing precipitate is immediately collected by centrifuging and then right away suspended with about 25% (v./v.) of 0.05 M maleate-$Mn^{++}$ buffer, calculated upon the volume of the filtrate before addition of the acetone. The mixture is stirred in the cold room for several hours, passed through plastic gauze and clarified by centrifuging.

Heat labile protein removal

The supernatant is heated rapidly to about 60° C. with stirring in a stainless steel or glass lined kettle and maintained at or close to 60° C. for about 20 minutes. Thereafter, the mixture is cooled to about 5° C. as rapidly as possible and the bulky precipitate is removed in the cold room by slow suction over a broad filter surface or by centrifugation. The clear solution is brought to 2–5° C. and 0.9 volume of denatured ethanol (−10° C.) is added from a reservoir through a glass tube extending well below the surface of the mixture. Effective stirring is essential and the temperature must remain at 5° C. or lower.

After the addition of the alcohol has been completed, the mixture is kept in the cold room just long enough to permit the precipitate to compact and to settle. The precipitate is recovered by vacuum filtration or centrifugation and immediately dissolved in cold 0.001 M maleate-$Mn^{++}$ buffer, pH 7.0. The amount of buffer is approximately 4 v./wt. The solution is clarified by centrifuging, the supernatant decanted, the precipitate re-extracted using small amounts of cold buffer, the supernatants combined and lyophilized. Prior dialysis to remove buffer ions, while possible, is not necessary at this point. The resultant powder is stable for several months at room temperature but preferentially is kept in the cold room. It represents a mixture of the desired orgotein, arginase and other enzymes, albumin and other non-essential proteins.

Removal of less soluble material and transchelation

For further processing, this powder is dissolved in about 12 times the volume of cold 0.2 M tris—0.001 M $Mg^{++}$ buffer, pH 7.8. This solution is treated with cold saturated ammonium sulfate solution, 0.001 M in $Mg^{++}$. Five increments of 375 ml. each are added per 1000 ml. of buffer solution. The respective states of saturation achieved by this technique are 15%, 30%, 45%, 60% and 75%. In each instance the addition of the ammonium sulfate solution is carried out slowly at 0–5° C. with stirring. Stirring is continued for another ten minutes and the resulting precipitate is collected by centrifuging at 4500 r.p.m.'s for thirty minutes at 0° C.

Of the five precipitates obtained, the first one (A) is discarded. It represents high-molecular weight-protein impurities. The second and third precipitates (B and C) are combined. They represent arginase and other enzymes which can be processed separately for the isolation of these products. The fourth and fifth (D and E) are also combined. They contain the desired orgotein, in a still crude state, contaminated with albumin and various other proteins both of lower and higher molecular weight. The final supernatant is discarded. It contains low molecular proteins and other undesirable impurities.

Chromatography

Precipitates D and E are dissolved in 0.03 M tris-glycine–0.001 M $Mg^{++}$ buffer, pH 7.8 at a concentration as close to 10% (w./v.) as possible and dialyzed against cold buffer until negative to sulfate ion. The dialyzed solution is clarified by centrifugation and the supernatant is passed through a Millipore filter. The filtrate is applied directly to the head of a chromatography column (3 x 18 inches) filled with Sephadex G–100 (crosslinked dextran resin, Pharmacia, Sweden). The Sephadex has been swelled, defined and washed by standard techniques described in literature of the manufacture. The packed column is equilibrated with 0.03 M tris-glycine–0.001 M $Mg^{++}$ buffer, pH 7.8 and adjusted to a flow rate of about 20 ml. per hour.

After application to the column, the sample is permitted to equilibrate within the first few cm. of the resin bed for approximately 30–45 minutes when fractionation is started. Individual fractions of up to 10 ml. are collected. The emergence of peaks is determined by measuring the protein concentration by the absorbance at 280 millimicron.

Two and sometimes three peaks emerge from the column prior to the emergence of the desired orgotein. They represent albumin and other undesirable protein impurities of similar or larger molecular weight. Fractions representing these peaks are discarded. The desired protein generally emerges in the range of 100–150 ml. of total eluate. These fractions are combined for further processing. Residual, lower molecular weight protein impurities emerge from the column on further elution, particularly on increasing the ionic strength of the buffer. They are removed to clear the column for a subsequent run.

Buffer and excess $Mg^{++}$ ion removal

The combined fractions containing the desired orgotein are dialyzed against deionized $H_2O$–0.001 M $Mg^{++}$ until they contain less than $10^{-6}$ M tris buffer. Thereafter, dialysis is continued against deionized water containing $1-5 \times 10^{-3}$ M ortho-phenanthroline or ethylenediamine tetraacetic acid salts until the concentration of $Mg^{++}$ has been reduced to less than $10^{-7}$ M. If a protein chelate is desired whose predominant metal is other than magnesium, e.g., calcium, copper, iron or zinc, expose the protein after dialysis for about a day to a soluble salt of the metal of choice of a molarity which maintains the protein in solution, and then remove excess metal ion in the manner described above. The resultant solution is clarified by centrifuging and the supernatant is treated in either of two ways. For the preparation of bulk protein powder the solution is lyophilized. For the preparation of sterile protein solution for injection purposes, dextrose is added to the solution to 5% w./v. The dextrose solution is then sterilized in Millipore filtration and filtered into pre-sterilized ampules or vials under sterile conditions to be used as such or as a lyophilized powder.

75 kg. of fresh beef liver, which contains about 70% water and is equivalent to about 22.5 kg. of dry matter, yields about 200 grams (1%) of the $Mn^{++}$ chelate intermediate.

200 grams of the $Mn^{++}$ chelate yield 12.3–17.5 grams (0.06–0.08%) of combined D and E fractions. On Sephadex chromtography, these amounts of D and E fractions yield 2.4 to 2.9 grams of the desired protein, equivalent to an overall yield of 0.011–0.014% calculated on the dry weight of the liver.

PREPARATION 4

The following are examples of an improved process for the isolation of orgotein claimed in the application of W. Huber, S.N. 150,809, filed June 7, 1971, as a continuation-in-part of S.N. 657,866, filed Aug. 2, 1967, now abandoned.

All operations, unless otherwise indicated, are carried out in a cold room (2–5° C.).

(a) Removal of insoluble material

Finely macerated fresh beef liver is mixed with cold 0.025 M tris-glycine buffer containing 0.01 M $Mn^{++}$ at pH 7.5 (two liters per kg. of liver). Adjust pH to 7.5 if necessary. Thereafter, if the liver is fatty, 50 ml. of toluene per kg. of liver are added. The mixture is stirred 4–6 hours. The resulting suspension is centrifuged at 20,000G for 10–20 minutes for pressed through plastic gauze and the insolubles discarded.

(b) Removal of more soluble material

To the aqueous filtrate obtained in the preceding step is added rapidly and with thorough agitation 1.25 volumes of cold acetone ($-10°$ C.) through a glass tube extending well below the surface of the mixture. The ensuing precipitate is immediately collected by centrifuging, e.g., for 10 minutes at 20,000G. Completeness of precipitation is checked by adding an additional 0.25 to 0.50 volumes of acetone to the filtrate. Any additional precipitate is also collected. The precipitated proteins are quickly suspended with about 25% (v./v.) of 0.025 M tris-glycine buffer at pH 7.5 containing 0.01 M $Mn^{++}$, calculated on the volume of the filtrate before addition of the acetone. The mixture is stirred in the cold room for several hours. The insolubles are removed by centrifuging and the clear supernatant is adjusted to achieve an about 10% protein concentration. Protein concentration can be determined by biuret analysis or other standard method.

(c) Heat labile protein removal

The thus-obtained buffer solution is heated rapidly to about 60° C. with stirring in a stainless steel or glass lined kettle and maintained at or close to 60° C. for about 20 minutes. Thereafter, the mixture is cooled to about 5° C. as rapidly as possible and the bulky precipitate is filtered in the cold room by slow suction over a broad filter surface or centrifuged at 12,000 to 16,000G for 10 minutes. The precipitate is re-extracted, using small amounts of cold buffer, and the clear supernatants combined. The precipitate is discarded.

(d) Removal of less soluble material and transchelation

The solution from the heat treatment step is concentrated, if necessary, to a protein concentration of about 8%, e.g., using an ion selective membrane (Diaflo Membrane, Amicon Corp., Cambridge, Mass.) to remove excess buffer. The protein solution is mixed slowly and with stirring with cold saturated ammonium sulfate solution containing $10^{-3}$ M $Mg^{++}$, $10^{-4}$ M $Cu^{++}$ and $10^{-5}$ M $Zn^{++}$ to a 45% $(NH_4)_2SO_4$ concentration. Stirring is continued for another 15 minutes and the resulting precipitate is removed by centrifuging at 20,000G for thirty minutes at 0° C. and discarded. To the filtrate is added an additional amount of the saturated ammonium sulfate solution to bring the protein solution to 65% $(NH_4)_2SO_4$ concentration. The resulting precipitate contains the desired protein and is collected by centrifugation or filtration. The final supernatant is discarded.

(e) Gel filtration

The final precipitate from the $(NH_4)_2SO_4$ step is dissolved in 0.025 M tris-HCl or tris-glycine or 0.01 M phosphate or borate buffer, containing $10^{-3}$ M $Mg^{++}$, $10^{-4}$ M $Cu^{++}$ and $10^{-5}$ M $Zn^{++}$, at pH 7.8 to a concentration as close to 10% (w./v.) as possible and dialyzed against cold buffer until negative to sulfate ion. The dialized solution, after clarification by centrifugation, if necessary, is passed through a Millipore filter. The filtrate is applied directly to the head of chromatography columns (3 x 18 in.) filled with Sephadex G–100 or G–75 (epichlorohydrin cross-linked dextran resin, Pharmacia, Sweden). The Sephadex has been swelled, refined and washed by standard techniques described in literature of the manufacturer. The packed columns are equilibrated with one of the above-described buffers and adjusted to a flow rate of about 20 ml. per hour. The addition of 5–10% dextrose or sucrose to the solution improves uniformity of adsorption, which facilitates subsequent resolution.

After application to the column, the sample is permitted to equilibrate within the first few cm. of the resin bed for approximately 30–45 minutes, at which time fractionation is started, the column being developed with additional buffer solution. Individual fractions of up to 10 ml. are collected. The emergence of peaks is determined by measuring the protein concentration by the absorbance at 280 millimicrons.

Two and sometimes three peaks emerge from the column prior to the emergence of the desired protein. They represent albumin and other undesirable protein impurities of similar or larger molecular volume. Fractions representing these peaks are discarded. The desired protein generally emerges in the range of 130–170 ml. of total eluate. These fractions are combined for further processing. Residual, lower molecular weight protein impurities emerge from the column on further elution, particularly on increasing the ionic strength of the buffer. They are removed to clear the column for a subsequent run.

(f) Buffer and excess $Me^{++}$ ion removal

The combined fractions containing the desired protein are filtered through a column of mixed bed resin Amberlite MB–1 Monobed gel-type Ion Exchange Resin (Rohm & Haas), a styrene-divinyl benzene strongly acidic ($-SO_3^-H^+$) strongly basic

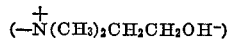

group-containing mixed copolymer which reduces buffer, $Mg^{++}$, $Cu^{++}$ and $Zn^{++}$ ion concentration to less than $10^{-7}$ M.

A column 1.45 x 45 inches is half filled with demineralized water from which all air bubbles have been removed. A slurry of the resin in air-free demineralized water is poured gently into the column and allowed to settle. The column is then back-washed several times with demineralized water to constant pH (ca. 7.0) and ionic strength (conductance about 1.0 mho) of the effluent. The final bed height is 33 inches, giving a bed volume of 58.3 cubic inches (957 milliliters) and total exchange capacity of 440 milli-equivalents, based on a factor of 0.46 given by the manufacturer for this resin.

The fractions from the gel filtration step containing the desired protein are combined and concentrated, if necessary, to a protein content of 8–10%. This solution is carefully loaded onto the top of the column and thereafter developed with demineralized water. The flow rate is adjusted to about 20 milliliters per minute and the appearance of the protein in the eluate is monitored by ultraviolet absorption ($A_{280}$). The eluate is collected in about 25 milliliter fractions. The desired protein generally appears in the fourth to twelfth fractions. Buffer-$Me^{++}$ concentration drops well below $10^{-7}$ M, as indicated by a drop of conductivity from 4,000 to 5,000 mho before column filtration to 1.5–2.5 mho thereafter.

For the preparation of a sterile protein solution for injection purposes, fructose, sucrose or other saccharide is added to the resulting buffer solution to a concentration of 2 parts saccharide per part protein. The solution is then sterilized by ultra-filtration and filtered into pre-sterilized ampoules or vials under sterile conditions. The resulting product can then be lyophilized to produce a more stable product.

Following the above-described process, 75 kg. of fresh beef liver (22.5 kg. dry weight), yields about 25–40 grams (0.12–0.17%) of final precipitate from the $(NH_4)_2SO_4$ step and 7 to 9 grams of the final, fully purified desired protein, equivalent to an overall yield of 0.032–0.041% calculated on the dry weight of the liver, a 300 or more percent increase in yield over that obtained by the process described in Ser. No. 576,454.

In an alternative procedure, the filtrate from Step (a), instead of being diluted with acetone, is first heated for about 20 minutes at or close to 60° C., then rapidly cooled to about 5° C. The resulting precipitate is removed by filtration or centrifugation and discarded. The filtrate is then treated with acetone as in Step (b). Step (c) is omitted. The precipitate obtained from the acetone treatment is dissolved in 0.025 M tris-glycine buffer containing $10^{-3}$ M $Mg^{++}$, $10^{-4}$ M $Cu^{++}$, $10^{-5}$ M $Zn^{++}$ at pH 7.5 adjusted if necessary to a protein concentration of about 8% and then treated as in Steps (d), (e) and (f).

PREPARATION 5

The following is an example of a process for the isolation of orgotein from red blood cells claimed in the application of W. Huber, Ser. No. 815,175, filed Apr. 10, 1969, and in U.S. 3,579,495.

Fresh beef blood was centrifuged at 2,600×G for 10 minutes at 0° C. and the plasma decanted. The red cells were then washed repeatedly with 2 to 3 volumes of 0.9% saline solution. The washed red cells were hemolyzed by mixing with 1.1 volumes of cold deionized water containing 0.02% detergent (Saponin). After a minimum of 30 minutes at 4° C., 0.25 volume (per volume of hemolysate) of ethyl alcohol at −15° C. was slowly added with stirring followed by 0.31 volume (per volume of hemolysate) of chloroform, also at −15° C. Stirring was continued for about 15 minutes at −5° C. or below, at which time the mixture was a thick paste. The hemoglobin precipitation was carried out in a cold bath which was kept at below −10° C. After the paste had stood for a further 15 minutes at 4° C., 0.2 volume of cold 0.15 M NaCl solution was added, giving an easily poured suspension. The precipitate and excess chloroform were removed by centrifuging at 20,000×G at about −10° C. for 10 minutes. The supernatant liquid was filtered and dialyzed against cold-deionized water. The dialyzed solution was lyophilized.

The alcohol-chloroform precipitate was re-extracted with a minimum amount of deionized water by blending the precipitate and water in a blender and centrifuging. Usually, a volume of water equal to that of the volume of starting red blood cell is needed. The re-extraction solution was dialyzed and lyophilized. Re-extraction of the precipitated hemoglobin often yields 30–50% of protein mixture present in the original supernatant. Depending upon the structure of the precipitate, a second re-extraction may give an additional 10–15%.

The lyophilized material was re-dissolved in 0.025 M tris-glycine buffer containing 0.001 M $Mn^{++}$ at pH 7.5 (usually to a concentration of 20 mg./ml.). The solution was heated at or close to 65° C. for about 15 minutes. This step removes carbonic anhydrase and other heat labile enzymes from the solution. After heating, the solution was quickly cooled in an ice bath to about 5° C. The solution was then centrifuged at 20,000×G at 0° C. for 10 minutes to remove the precipitate. The supernatant was dialyzed against deionized water to remove excess metal ions and buffer and then lyophilized. The resulting solid is rich in orgotein.

(a) Gel filtration

Sephadex G-75 is slowly added to warm deionized water (approximately 60° C.) with continuous stirring. The vessel containing the mixture is then placed in a 60° C. water bath for five hours and 45 minutes, removed and allowed to stand for one hour at room temperature. The supernatant and fines are decanted by suction. Buffer is added to the swollen Sephadex gel at four to five times its volume. The Sephadex gel is stirred, allowed to settle, and the fines and supernatant removed by suction. Fresh buffer is again added to the swollen gel and the above process repeated four times. The final suspension is chilled to 4° C. and is then deaerated under reduced pressure before use.

A recirculating column made of polymethacrylate is used. The column is 1050 mm. long and has an internal diameter of 32 mm. In filling the column with degassed buffer, special care is taken to insure that no air bubbles are trapped near the filter and on the sides of the column. The buffer filled column is then moved into the cold room and clamped into a vertical position with the aid of a carpenter's level. After equilibration in the cold room, the gel slurry is poured into a funnel connected to the top of the column with continued mechanical stirring. When a layer of Sephadex a few centimeters thick has formed on the bottom of the column, the outlet at the bottom of the column is opened to allow an even flow. During the packing, a rising horizontal surface of gel in the tube indicates proper uniformity in packing. After approximately 95 cm. of gel has settled, the excess gel and buffer are removed. After the top surface of the gel has completely settled, the top of the column is closed with a plunger fitted with a filter disc. Buffer is then circulated through the column for two days in order to stabilize the bed. Flow rate is maintained at 10 ml. per hour. Final bed volume, $V = \pi r^2 n = (3.14)(1.6 \text{ cm.})^2(96.5 \text{ cm.}) = 775.7$ cc.

The lyophilizate from the heating step is dissolved in buffer (20 mg./ml.) Insolubles, if present, are removed by centrifugation followed by Millipore filtrations. The clear solution is loaded on the column using an LKB selector valve (Model 4911B).

All column runs are performed at 4° C. The buffer used is 0.05 M tris-HCl, pH 7.5, 0.15 M in KCl and 0.005 M in glycine, containing $10^{-3}$ M $Mg^{++}$, $10^{-4}$ M $Cu^{++}$ and $10^{-5}$ M $Zn^{++}$.

The protein solution is loaded from the bottom. Ascending buffer flow rate is maintained at 10 ml. per hour. Protein content of fractions is determined by absorbance at 280 mμ.

The elution volume for each protein can be monitored both volumetrically and gravimetrically.

If prior processing has proceeded normally, the first peak which emerges from the column is orgotein. It generally emerges in the range of 300–400 ml. of total eluate. These fractions are combined for further processing. Following the main, well defined peak is sometimes a shoulder which contains orgotein mixed with small amounts of a minor impurity, which need not be separated. However, it can be separated by collecting the eluate fractions separately, and then further purified by recycling. Lower molecular weight protein impurities emerge from the column substantially later, upon further elution. They are removed to clear the column for a subsequent run.

(b) Buffer and excess metal ion removal

The orgotein solution obtained from the gel filtration is filtered through a column of mixed bed resin Amberlite MB-1 Monobed gel-type Ion Exchange Resin, Rohm & Haas), a styrene-divinyl benzene strongly acidic ($-SO_3^-H^+$), strongly basic

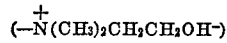

group-containing mixed copolymer which reduces buffer and unbound $Mg^{++}$, $Cu^{++}$ and $Zn^{++}$ ion concentrations to less than $10^{-7}$ M. Alternatively, this can be done by dialysis.

A column 1.45 x 45 inches is half filled with demineralized water from which all air bubbles have been removed. A slurry of the resin in air-free demineralized water is poured gently into the column and allowed to settle. The column is then back-washed several times with demineralized water to constant pH (ca. 7.0) and ionic strength (conductance about 1.0 mho) of the effluent. The final bed height is 33 inches, giving a bed volume of 58.3 cubic inches (957 milliliters) and total exchange capacity of 440 milliequivalents, based on a factor of 0.46 given by the manufacturer for this resin.

The eluate from the gel filtration step containing the orgotein is concentrated, if necessary, to a protein content of 8–10%. This solution is carefully loaded onto the top of the column of ion exchange resin and thereafter developed with demineralized water. The flow rate is adjusted to about 20 milliliters per minute and the appearance of the protein in the eluate is followed by ultraviolet absorption ($A_{280}$). The eluate is collected in 25 to 50 milliliter fractions. The desired protein generally appears in the fourth to twelfth fractions. Buffer-$Me^{++}$ concentration drops well below $10^{-7}$ M, as indicated by a drop of conductivity from 4,000 to 5,000 mho before column filtration to 1.5–2.5 mho thereafter.

By the same procedure orgotein congeners having the properties given above can be isolated in >98% purity from horse, sheep, rabbit and chicken red blood cells in 0.01, 0.005, 0.008 and 0.006% overall yield, respectively, and also from human, pig, and other mammalian red blood cells.

PREPARATION 6

The following is an example of a process claimed in the application of W. Huber, Ser. No. 3,492, filed Jan. 16, 1970, for the removal of the small amount of tenacious extraneous protein present in substantially pure orgotein isolated from beef liver in the manner described in Examples 1–3.

Solutions of a production lot of orgotein of about 90% purity at a concentration of 5 mg. protein per ml. of 0.005 M glycine buffer, pH 8.5, in 0.9% saline were pipetted into each of five clean glass containers of equal size. This lot of orgotein contained 10.5% slow moving protein impurity, based on stain intensity (Amido Black) of electrophoretically separated slow-moving protein. Container 1 was used as a control, and containers 2 to 5 were heated at 70° C. at 15, 30, 45 and 60 minutes, respectively.

After heating, the orgotein solution in each of the containers, including the control, was filtered through Millipore. A biuret protein determination was made on the clear filtrate. Each of the containers contained the following:

| | Ml. |
|---|---|
| Filtered orgotein solution | 0.5 |
| Buffer | 0.5 |
| Biuret reagent | 1.5 |

The heated samples were examined electrophoretically in agarose thin film gels. Slow moving and backward moving material in the orgotein sample was removed to some degree after heating 15 minutes at 70° C., and more so after heating 30 minutes at 70° C. They were completely removed after heating for 45 and 60 minutes at 70° C. At this point the background of the electropherogram looked much clearer, also. Orgotein loss was 12–16%.

PREPARATION 7

The following is an example of another process for the removal of the tenacious impurity present in substantially pure orgotein isolated from beef liver in the manner described in Examples 1–3, which process is claimed in the application of W. Huber Ser. No. 3,538, filed Jan. 16, 1970.

Impure lots of orgotein containing 28.2, 20.9 and 27.8%, respectively, of "slow moving" (on gel electrophoresis in thin film agarose) impurities and 17.1, 19.9 and 11.8%, respectively, of "background impurities" (causing a smearing on gel electrophoresis) were selected by virtue of their high content of impurities from rejected batches. In the Ungar anti-inflammatory bioassay one of these lots had failed badly while the others had failed marginally.

The buffer used was 0.1 M phosphate, pH 6.0;

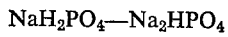

(1:7 vol./vol.). The anion exchange resin used was Whatman DEAE cellulose-52, microgranular (W. & R. Balston, Ltd., Hardstone, Kent, England). This ion exchanger is supplied wet and pre-swollen, thus obviating the need for re-suspension.

To prepare the column, 30 g. of the DEAE-cellulose was stirred into 300 ml. of 0.1 M phosphate buffer, pH 6.0. The slurry was allowed to settle and the supernatant decanted. 0.01 M phosphate buffer, pH 6.2, was added and the mixture stirred thoroughly. The slurry was allowed to settle for 10 minutes and the supernatant decanted. This step serves both to equilibrate the cellulose with the buffer and to remove the fines, which is important since they reduce the column flow rate. Washing the cellulose with the starting buffer was repeated until both the pH and the conductivity remained constant at the correct values. Gentle vacuum was applied to the slurry to remove occluded air and carbon dioxide. The slurry was used immediately for column packing. If the resin is left in contact with buffers or polyelectrolytes for longer than one week, a preservative, e.g., 0.03% toluene, should be added.

A glass column of 1.5 cm. diameter fitted with a nylon net and a Millipore filter support unit at the bottom was mounted vertically. The column was filled with 0.01 M sodium phosphate buffer, pH 6.2. The equilibrated and relatively thick DEAE-cellulose slurry (about 120–150% of original volume) was poured into the column through a funnel attached to the top of the column. The column top was closed until 1 cm. of the cellulose had settled at the bottom. The column top was then opened to allow free flow. A column of about 20 cm. was packed using settling times of 20–30 minutes. The slow sedimenting fines at the top of the column were removed by suction. The column was equilibrated by running starting buffer through for several hours or overnight. The pH and conductivity of the eluate were checked to ensure full equilibration between the exchanger and the buffer. Flow rate was adjusted by hydrostatic pressure by placing the buffer source about 40 cm. above the head of the column, which produces a flow rate of about 30 ml. per hour for a column of 1.5 cm. in diameter and 20 cm. in height with a bed volume of 30 ml.

100–200 mg. of the starting orgotein was dissolved in 2–4 ml. of starting buffer and the resulting greenish solution layered gently over the surface of the bed. After absorption, the orgotein solution appears as a broad greenish band near the top of the column. The column was then connected to the buffer reservoir and elution begun with 0.01 M phosphate buffer, pH 6.2. Five ml. fractions were collected, using a Simplex (B. Braun, Melsungen, West Germany) fraction collector. The column was operated at room temperature and the collected fractions were cooled by ice water. Upon application of the elution buffer, a brownish-pink band separated from the sample zone on the column. It moved rapidly downwards and was eluted immediately after the void volume, requiring a buffer volume of 40–50 ml. The material had a high absorbance at 280 m$\mu$ and by subsequent gel electrophoresis was shown to consist entirely of the slow moving impurity described above. After pooling of the fractions containing the slow-moving impurities, elution was continued with 0.01 M phosphate buffer, pH 6.2, to a total volume of about 300 ml. After about 120 ml. of eluate had been collected, additional material with less pronounced absorbance at 280 m$\mu$ was eluted. Subsequent electrophoresis of appropriately pooled fractions showed this material to be composed of background impurities described above. After elution of the background impurities, no further material could be eluted with 0.1 M phosphate buffer, pH 6.2.

Elution of the orgotein was carried out by stepwise increase of buffer ionic strength. No significant elution was observed until ionic strength had been increased about tenfold to 0.10 M, pH 6.2. At this point the zone remaining at the top of the column migrated rapidly downward as a sharp, light green band with the buffer front. Complete elution was achieved with about 60 ml. of 0.1 M buffer.

Eluted fractions 68 to 76, which contained the orgotein, were pooled, extensively dialyzed and then lyophilized. Dialysis for 3 to 5 days with numerous changes of deionized water were required to remove all extraneous non-chelated ions. In subsequent runs, increased ionic strength was achieved by the addition of 0.09 M NaCl to the starting buffer. This reduced the dialysis time required to remove extraneous non-chelated ions to about 2 days.

EXAMPLE 1

Dissolve dextrose to 5% w./v. in a solution of orgotein, e.g., as obtained in the last dialysis step of Preparation 2, 3 or 4 or from the ion exchange step of Preparation 5 or 7, or the heating step of Preparation 6; sterilize the resulting solution by Millipore micropore filtration; sterile filter into pre-sterilized ampoules or vials under sterile conditions. Thereafter, if desired, lyophilize to a sterile powder.

EXAMPLE 2

Dissolve pure or substantially pure orgotein of any of the preceding preparations in sterile water or sterile isotonic saline solution (0.1 mg./10 ml.). Sterile fill 10 cc. increments of the resulting solution directly into sterile rubber stopper vials. Cap and seal the vials. Freeze to store.

EXAMPLE 3

Follow the procedure of Example 2 except sterile lyophilize the contents of the vials prior to capping.

EXAMPLE 4

The following is an example of a process for the production of a stabilized solution of orgotein which is protected against denaturation during lyophilization and the production of orgotein in the form of a dry, sterile, storage-stable lyophilized powder suitable upon reconstitution for injection, which compositions are claimed in U.S. 3,637,640.

Fifteen parts of the isolated orgotein described in Preparations 2–4 and thirty parts of sucrose are weighed and mixed. The mixture is dissolved in 30 parts of demineralized water that has been adjusted to pH 9.4 by gaseous ammonia. The solution is then filtered with slight vacuum through a 0.45$\mu$ pre-wetted Millipore filter. The volume of filtrate is measured and the weight of protein therein calculated as follows: 2 ml. of the filtrate is mixed with 3 ml. Biuret Reagent and the mixture incubated for 15 minutes at 37° C. Absorbance at 555$\mu$ of the mixture is measured against a water (buffer) blank. Concentration in mg./ml. is determined by multiplying absorbance at 555$\mu$ by 9.1. This conversion factor was obtained by plotting the following data obtained from samples of known concentration on a graph:

| Protein conc., mg./ml.[1] | Absorbance A₅₅₅ | Protein conc., mg./ml.[1] | Absorbance A₅₅₅ |
|---|---|---|---|
| 3.7 | 0.407 | 0.45 | 0.050 |
| 1.8 | 0.197 | 0.22 | 0.024 |
| 0.9 | 0.100 | 0 | 0 |

[1] Dry weight (ca. 10% less than wet weight).

The aqueous samples are shell-frozen for storage. Lyophilization gives a solid orgotein composition which is storage stable at room temperature and which, when reconstituted with water, is free from insoluble denatured protein.

25 mg. of freshly prepared orgotein and 50 mg. of sucrose, fructose or galactose were dissolved in 50 ml. of demineralized water, brought to an alkaline pH (around 9) with ammonia water, filtered to give a storage stable orgotein solution.

EXAMPLE 5

Follow the procedure of Examples 1, 2, 3 or 4, except add 0.25–0.5% phenol and 0.004–0.01% thimerosal, 0.003–3% methyl paraben, 0.05–0.2% sodium azide or 0.05–0.2% benzyl alcohol to the saline solution as preservative.

EXAMPLE 6

To a solution of pure or substantially pure orgotein, e.g., produced according to the process of Preparation 3, dissolve sucrose therein to 5% w./v. Sterilize by Millipore filtration and sterile fill into pre-sterilized ampoules or vials in amounts which will provide the desired amount of orgotein per ampoule or vial, e.g., 0.1–5 mg. for a single dose vial and 5–50 mg. for a multidose vial. Lyophilize and seal the vials or seal and freeze the solution.

EXAMPLE 7

Follow the procedure of Example 6 but substitute sucrose for the dextrose, in an amount of 1–3 times the weight of the orgotein.

EXAMPLE 8

Follow the procedure of Examples 1, 2 or 4–7, employing 0.1–5 mg. of orgotein, but add 50–150 mg. of the 21-sodium succinate ester of hydrocortisone, 5–25 mg. of the same ester of 6-methylprednisolone, dexamethasone or betamethasone, per 0.2–0.5 mg. of orgotein prior to sterilization and lyophilization. These compositions when reconstituted with 1 ml. or more of plain or buffered water per 0.2–0.5 mg. of orgotein, are suitable for intravenous administration in emergency situations, e.g., status asthmaticus, drug and anaphylactic reactions, insect bites and other massive reaction to toxic animal protein and other conditions of shock.

EXAMPLE 9

A finely divided powdered mixture of orgotein and sucrose of Example 1 is dissolved in water or buffer (pH 7.5) to provide a 1% orgotein solution and mixed with an amount of an inert propellant conventionally employed for oral inhalation compositions and packaged in a nebulizer ("Devilbis") so as to dispense with each discharge of the nebulizer a measured dose of about 0.025 cc. (0.25 mg. orgotein) of the solution with an average particle size of less than 10 microns and preferably less than 5 microns.

The following examples illustrate methods of use of the compositions of this invention. The orgotein used therein, except for Examples 12, 14 and 15, was stabilized with twice by weight of sucrose, in the manner of Example 4 and administered in a sterile isotonic saline solution, neutral pH.

EXAMPLE 10

Sixteen horses with traumatic arthritis were given two I.M. injections of 0.50 mg. of orgotein (beef liver) as an isotonic saline solution. An observable improvement was noted in as short a period as four days.

EXAMPLE 11

A study of 178 horses by four different veterinarians demonstrated that in orthopedic disorders 5 mg. dosages of orgotein (in 2–5 ml. of U.S.P. sterile saline solution) administered intramuscularly in the neck, three times weekly for two weeks and two times weekly for two weeks, caused a reduction in associated lameness in 10 days on an average after an average total dose of 22 mg. After one month from initiation of treatment, there was a smoothing and rounding of the bony osteophytes in some cases.

EXAMPLE 12

20 of 25 San Francisco police horses with virus pneumorhinitis were injected intramuscularly with 3 spaced doses of 0.5 mg. of orgotein (beef liver) in 3 ml. sterile, isotonic saline solution. The condition of the controls was unchanged. All but one of the injected horses had a quick and complete recovery. That horse was given another 2.5 mg. injection. Improvement was dramatic. Temperature returned from 104° to normal within 24 hours. The condition of another group of ten horses was similarly improved with injections of from 0.16 to 1.00 mg. of orgotein. The coughing stopped in as short a time as 1½ hours. Even the smallest doses were effective.

EXAMPLE 13

Ten horses with normally occurring azoturia were given 5 mg. orgotein intramuscularly; within 20 minutes there was an obvious clinical benefit in a reduction of muscle spasms, tremors and sweating. In one hour the horses were galloping freely. Within 24 hours these animals all played polo and ran at speed and performed well and showed no untoward effect afterwards. If recurrence occurred, single or multiple, an identical repeat treatment proved equally effective.

EXAMPLE 14

Of fourteen race horses having respiratory tract virus infections of two weeks to three months standing and whose symptoms included engorged sinuses, difficulty in breathing, frequent severe cough, fever, swollen lymph glands and heavy discharge of bloody mucous from the nasal passages, eleven were treated by intramuscular injection with the orgotein of this invention at doses ranging from 0.4 to 1.4 mg. per injection. Vehicle was 5% dextrose, 1 ml. per 0.2 mg. protein. Treatment varied from 4 to 9 injections spread over 10–15 days. As controls, the other three horses were given placebo injections of 5% dextrose only. After treatment, none of the three control horses showed any improvement. The other eleven had a quick and complete recovery and were returned to racing.

EXAMPLE 15

A two year old race horse having severe pleuritis pronounced terminal by the veterinarian in charge was given five injections (0.4 mg. in 2 ml. 5% dextrose), over a period of 8 days, of orgotein. Recovery was complete.

EXAMPLE 16

A thoroughbred gelding, suffering from an acute coronary and acute mesenteric thrombosis, was diagnosed as dying. He was given 5 mg. orgotein intravenously and 5 mg. intramuscularly at the same time, and 5 mg. I.M. every three hours for three more doses, or a total of 25 mg. After 9 hours from onset, the horse had recovered. He was given a maintenance dose of 5 mg. intramuscularly twice weekly for 16 weeks, until he died of a strangulated small bowel and a huge diaphragmatic hernia. From the beginning of treatment until 2 days before his death, when the horse developed symptoms of colic, he was exercised, ridden on the track and played polo. Subsequent autopsy verified the existence of previous massive coronary thromboses.

EXAMPLE 17

Three horses with acute flexor deep and superficial tendonitis were given 5 mg. orgotein intramuscularly daily. Within 24 hours there was a definite reduction in lameness and tenderness on pressure to the affected area.

EXAMPLE 18

Three dachshund dogs with ossifying pacchymeningitis (non-surgical disc syndrome) and paralysis of the hind quarters were improved after 3 to 5 days following daily intramuscular injections of 2 mg. orgotein, and in each case remained clinically well for over nine months to one year without further treatment.

EXAMPLE 19

A Siamese spayed female, age 12 years, suffering from panleukopenia and clinically moribund was brought back to life, given orgotein at 2 mg. every 6 hours for 2 days. This same animal developed another attack over a year later and responded to the same treatment.

EXAMPLE 20 TOPICAL USE (a) For installation in an inflammed bladder, e.g., cystitis the urine is drained using a small soft rubber catheter. 5 ml. of a solution of orgotein in 0.9% saline at a concentration of 3-4 mg./ml. and is then instilled into the bladder. A small amount of air is injected to clear the catheter and the catheter is then withdrawn. The orgotein solution is not rapidly expelled. Clinical benefit, which may last six weeks, may be noted within an hour.

(b) Orgotein (10 mg. lyopholized powder) is incorporated into and mixed (1–10 mg./g.) with an oil and water emulsion base, e.g., HEB (Haydens Emulsified Base) containing acetyl and sterol alcohol, petrolatum, liquid petrolatum, sodium lauryl sulfate, propyl glycerol, butyl and methyl paraben and water. Topical application of this mixture to a freshly abraded skin surface or on to a hemorrhoid effectively and quickly reduced inflammation, pain and swelling. Topical use thereof on inflamed mucous membranes, eye, mouth, anus, genital tract and sinuses in an appropriate liquid pharmaceutically acceptable carrier reduces inflammation and relieves accompanying discomfort.

Alternatively, a 0.1–1% solution of orgotein in a buffered isotonic solution can be used, alone or in combination with a thickening agent, e.g., 0.02% polysorbate 80, or PEG 4,000, an antibiotic, e.g., neomycin sulfate or tetracycline and/or an antiinflammatory steroid, e.g., dexamethasone or betamethasone, and optionally, a decongestant for nose drops, e.g., phenylephrine hydrochloride, or a vasoconstrictor for eye drops, e.g., tetrahydrozoline hydrochloride.

EXAMPLE 21

65 cases of hydrocoele were treated by aspiration and injection locally into the hydrocoele sac of 4 mg. orgotein. The treatment was effective, as measured by no or less rapid refill time, in most of the patients.

EXAMPLE 22

24 cases of chronic congestive prostatitis were treated with 3 mg. orgotein intramuscularly with definite improvement of their inflammatory problem repeated in 2–6 months, when necessary.

EXAMPLE 23

3 cases of urethro trigonitis in the female were treated with marked benefit with 3 mg. intramuscular injections of orgotein 2–3 times a week for 1–2 weeks, repeating in 2–6 months if necessary.

EXAMPLE 24

Human joints, hips, knees and shoulders of patients suffering from arthritides have been improved by intraarticular injection of 2 mg. orgotein in about 1 ml. of previously removed synovial fluid or saline solution.

EXAMPLE 25

19 patients with radiation cystitis who had been treated with all known methods with no avail, were treated by multiple intramural injections through a cystoscope of a total of 10 mg. of orgotein in 10 ml. isotonic saline solution. The treatment was repeated 3 times a week for 1–2 weeks and thereafter in 2–6 months, if needed. All patients demonstrated a marked improvement. 5 cases of interstitial cystitis in which all previous treatment failed, showed marked improvement with similar orgotein therapy (intramural).

EXAMPLE 26

Human patients with herpes simplex of the mucous membranes (oral, genital and conjunctival) were successfully treated by orogtein 2 mg. intramuscular injections 2 times daily for 1–2 days and then daily for a total of 6–7 days. Cases of corneal and ophthalmic herpes were successfully treated with orgotein following the same protocol after all other treatment failed. Mononucleosis successfully treated with 2 mg. of orgotein intramuscularly daily for 3 days.

EXAMPLE 27

The trauma and lameness associated with sprains is relieved more rapidly by the injection of 2 mg. of orgotein directly into the tendon sheath.

EXAMPLE 28

A patient with anemia, renal failure and diabetic gangrene who had been severely diabetic for 40 years and had previously been given 45 blood transfusions was given orgotein intramuscularly (2 mg. daily for 10 days, increasing to 4 mg. daily for 4 days, then resting 3 days). During orgotein therapy, transfusions were not required for over sixteen months. The uremic and anemic problems are controlled and insulin requirements have been halved.

EXAMPLE 29

A patient suffering from pernio (frostbite), with inflammation, impaired circulation of the extremity and thrombosis of the small blood vessels, was given 2 mg. of orgotein intramuscularly daily for 3 days, followed one week later by the same dosage. Marked improvement was noted.

The procedure of Examples 10 to 19, 22, 23, 26, 28 and 29 can be followed with at least as good results by the administration of the orgotein subcutaneously.

The preceding examples can be repeated with similar success by substituting the generically or specifically described reactants and/or operating conditions of this invention for those used in the preceding examples.

From the foregoing description, one skilled in the art can easily ascertain the essential characteristics of this invention, and without departing from the spirit and scope thereof, can make various changes and modifications of the invention to adapt it to various usages and conditions.

What is claimed is:

1. A method of treating an inflammatory condition which comprises the administration of a therapeutically effective amount of a pharmaceutical composition comprising, in admixture with a pharmaceutically acceptable carrier and substantially free from other proteins with which the orgotein was admixed or associated in the source thereof, an effective unit dosage amount of orgotein, a member of a family of protein congeners characterized physically by being the isolated, substantially pure form of a globular, buffer and water-soluble metalloprotein having a highly compact native conformation which is stable to heating for several minutes at 65° C. in water or a buffer solution containing a salt of a divalent metal having an ionic radius of 0.60 to 1.00 A., and which on gel electrophoresis at pH 8.45 in 0.1 M Tris-glycine buffer gives a characteristic multiple-band pattern; characterized chemically by containing at least all but two of the protein aminoacids, a small percentage of carbohydrate, no lipids, 0.1 to 1.0% metal content provided by about 3 to 5 gram atoms per mole of one or more chelated divalent metals having an ionic radius of 0.60 to 1.00 A., and substantially no chelated monovalent metals or cell poisons in the molecule; characterized pharmacodynamically by being a non-toxic, immunologically well-tolerated, injectable protein whose pharmacological activity includes anti-inflammatory activity; and characterized immunologically by a congener relatedness sufficient to enable the antibodies of one congener to recognize as an antigen another congener.

2. A method according to claim 1 wherein the administration is parenteral.

3. A method according to claim 2 wherein the administration is intramuscular.

4. A method according to claim 1 wherein the administration is local, proximate the site of a local inflammation.

5. A method according to claim 4 wherein the composition is applied onto the surface of an inflamed body area.

6. A method according to claim 4 wherein the composition is introduced into an inflammed body cavity.

7. A method according to claim 6 wherein the body cavity is the bladder.

8. A method according to claim 1 wherein the administration is intraarticular.

9. A method according to claim 1 wherein the administration is intramural.

10. A method according to claim 1 wherein the inflammatory condition is in an acute stage.

11. A method according to claim 10 wherein the inflammatory condition is rheumatoid arthritis.

12. A method according to claim 1 wherein an anti-inflammatory steroid is also administered.

13. A method according to claim 12 wherein the steroid is administered concurrently.

14. A method according to claim 13 wherein the steroid is administered in admixture with the orgotein.

15. A method according to claim 2 wherein the administration is subcutaneous.

References Cited

UNITED STATES PATENTS

| | | | |
|---|---|---|---|
| 3,637,641 | 1/1972 | Huber et al. | 424—177 |
| 3,579,495 | 5/1971 | Huber | 260—115 |
| 3,637,640 | 1/1972 | Huber | 260—115 |

FOREIGN PATENTS

| | | |
|---|---|---|
| 6614177 | 4/1967 | Netherlands. |
| 1,160,151 | 7/1969 | Great Britain. |

HOWARD E. SCHAIN, Primary Examiner

U.S. Cl. X.R.

260—112 B, 112 R, 113